United States Patent [19]

Richek et al.

[11] Patent Number: 5,257,387
[45] Date of Patent: Oct. 26, 1993

[54] COMPUTER IMPLEMENTED METHOD AND APPARATUS FOR DYNAMIC AND AUTOMATIC CONFIGURATION OF A COMPUTER SYSTEM AND CIRCUIT BOARDS INCLUDING COMPUTER RESOURCE ALLOCATION CONFLICT RESOLUTION

[75] Inventors: Martin D. Richek; Robert S. Gready, both of Houston; Curtis R. Jones, Jr., Cypress, all of Tex.

[73] Assignee: Compaq Computer Corporation, Houston, Tex.

[21] Appl. No.: 403,297

[22] Filed: Sep. 5, 1989

Related U.S. Application Data

[63] Continuation-in-part of Ser. No. 293,315, Jan. 4, 1989, which is a continuation-in-part of Ser. No. 242,734, Sep. 9, 1988, abandoned.

[51] Int. Cl.$^5$ .............................................. G06F 15/76
[52] U.S. Cl. .................................... 395/800; 395/700; 364/DIG. 1; 364/229.4; 364/246.3; 364/281.9; 364/970
[58] Field of Search ............... 395/700, 275, 700, 800

[56] References Cited

U.S. PATENT DOCUMENTS

| | | | |
|---|---|---|---|
| 3,675,083 | 7/1972 | White | 361/413 |
| 3,680,052 | 7/1972 | Arulpragasam et al. | 395/325 |
| 3,787,816 | 1/1974 | Hauck et al. | 395/575 |

(List continued on next page.)

FOREIGN PATENT DOCUMENTS 83111761 11/1983 European Pat. Off. .
88103609 3/1988 European Pat. Off. .

OTHER PUBLICATIONS

IBM Corp., Personal System/2 Model 80 Technical Reference, 1st Edition, Apr. 1987, pp. 2-51 to 2-63.
IBM Corp., Supplements for the PS/2 Model 70, Hardware Interface, and BIOS Interface Technical References, PS/2 Model 70 Programmable Option Select section, pp. i to 55, Aug., 1988.
EISA Press Release, Sep. 13, 1988.
PC Magazine, The Gread Divide—EISA vs. Micro-Channel, pp. 165-186, Dec. 27, 1988.
Vol. 1, IBM Corp., Technical Disclosure Bulletin, Oct. 1988.

Primary Examiner—Parshotam S. Lall
Assistant Examiner—Krisna Lim
Attorney, Agent, or Firm—Pravel, Hewitt, Kimball & Krieger

[57] ABSTRACT

A computerized system for dynamically and automatically configuring circuit boards to carry out functions from various manufacturers and a computer system without the user intervention. A single computer system may include, for example, a modem board, a video board, a disk controller board, and a multiple function board, each circuit board from a different manufacturer and each circuit board requires a computer resources for operation. These resources may include interrupt request (IRQ) lines, direct memory access (DMA) channels, I/O port addresses, memory address ranges and circuit board slot locations. The computerized system determines the type of slot required for each circuit board to be inserted in the computer by reading the circuit board configuration file for each board. The system will assign a circuit board to an available slot locations of the required type. Based on the information contained within the circuit board configuration files, the system attempts to allocate the common computer resources required by each circuit board based on the primary or default resource requirements set forth in each circuit board's configuration file. And, overlapping manufacturer default resource requirement may result in resource allocation conflict; and then, the system attempts to resolve conflicts by determining if the conflicting request may be assigned an alternate resource, as specified in the circuit board configuration file. The system stores the resource allocation information as part of a system configuration file which may then be used when the system is rebooted.

64 Claims, 20 Drawing Sheets

U.S. PATENT DOCUMENTS

| | | | |
|---|---|---|---|
| 4,014,005 | 3/1977 | Fox et al. | 395/100 |
| 4,070,704 | 1/1978 | Calle et al. | 395/700 |
| 4,250,563 | 2/1981 | Struger | 395/800 |
| 4,403,303 | 9/1983 | Howes et al. | 395/500 |
| 4,562,535 | 12/1985 | Vincent et al. | 395/325 |
| 4,589,063 | 5/1986 | Shah et al. | 395/275 |
| 4,590,556 | 5/1986 | Berger et al. | 395/700 |
| 4,590,557 | 5/1986 | Lillie | 395/700 |
| 4,622,633 | 11/1986 | Ceccon et al. | 395/700 |
| 4,635,192 | 1/1987 | Ceccon et al. | 395/325 |
| 4,701,878 | 10/1987 | Günkel et al. | 395/325 |
| 4,727,475 | 2/1988 | Kiremidjian | 395/325 |
| 4,750,136 | 6/1988 | Arpin et al. | 364/514 |
| 4,760,553 | 7/1988 | Buckley et al. | 395/575 |
| 4,803,623 | 2/1989 | Klashka et al. | 395/275 |
| 4,885,482 | 12/1989 | Sharp et al. | 307/465 |
| 4,905,182 | 2/1990 | Fitch et al. | 395/275 |
| 4,931,923 | 6/1990 | Fitch et al. | 395/500 |
| 4,951,248 | 8/1990 | Lynch | 395/425 |
| 4,992,976 | 2/1991 | Yonekura et al. | 395/100 |
| 5,014,193 | 5/1991 | Garner et al. | 395/275 |
| 5,056,060 | 10/1991 | Fitch et al. | 395/275 |
| 5,161,102 | 11/1992 | Griffin et al. | 395/800 |

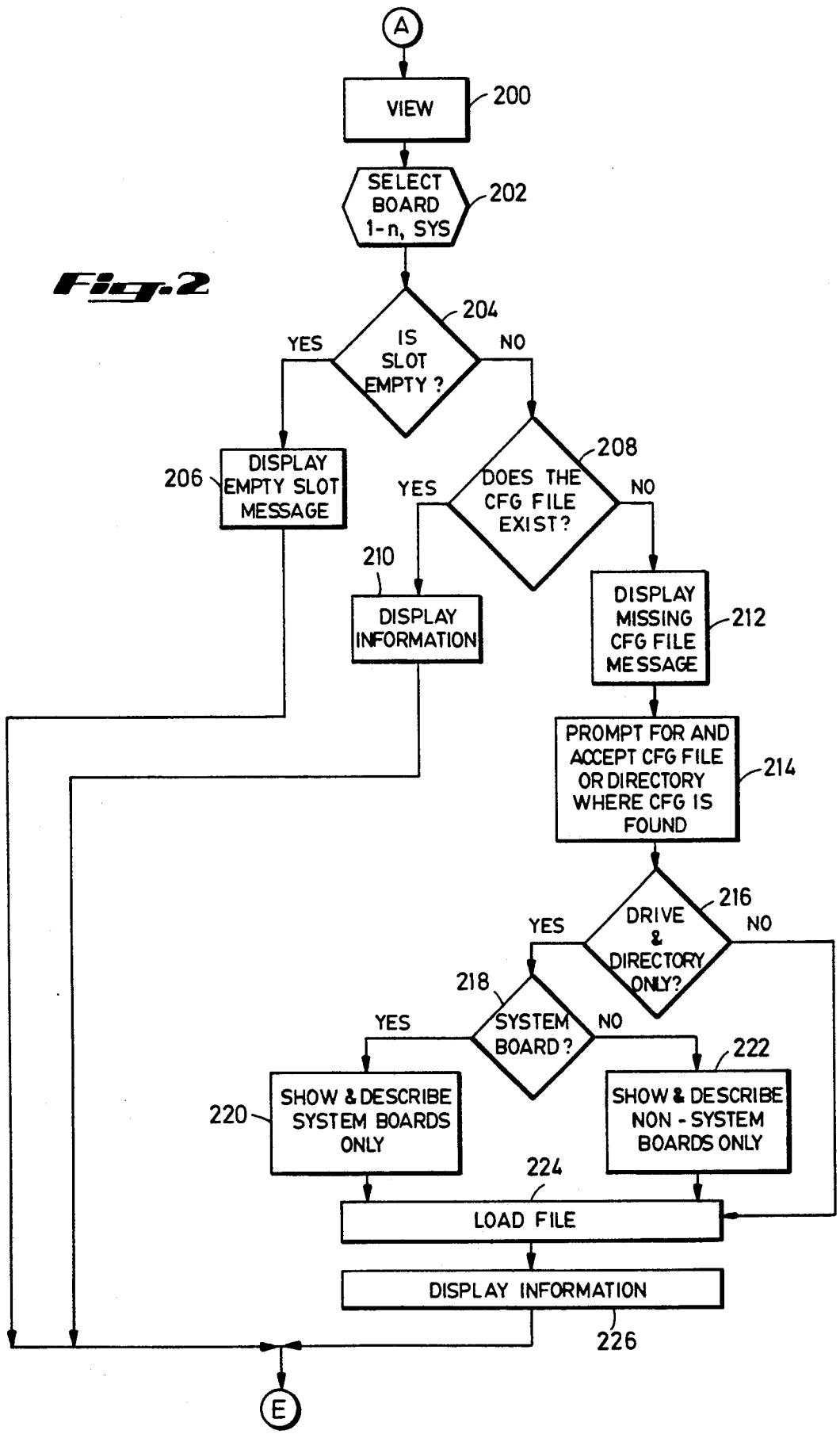

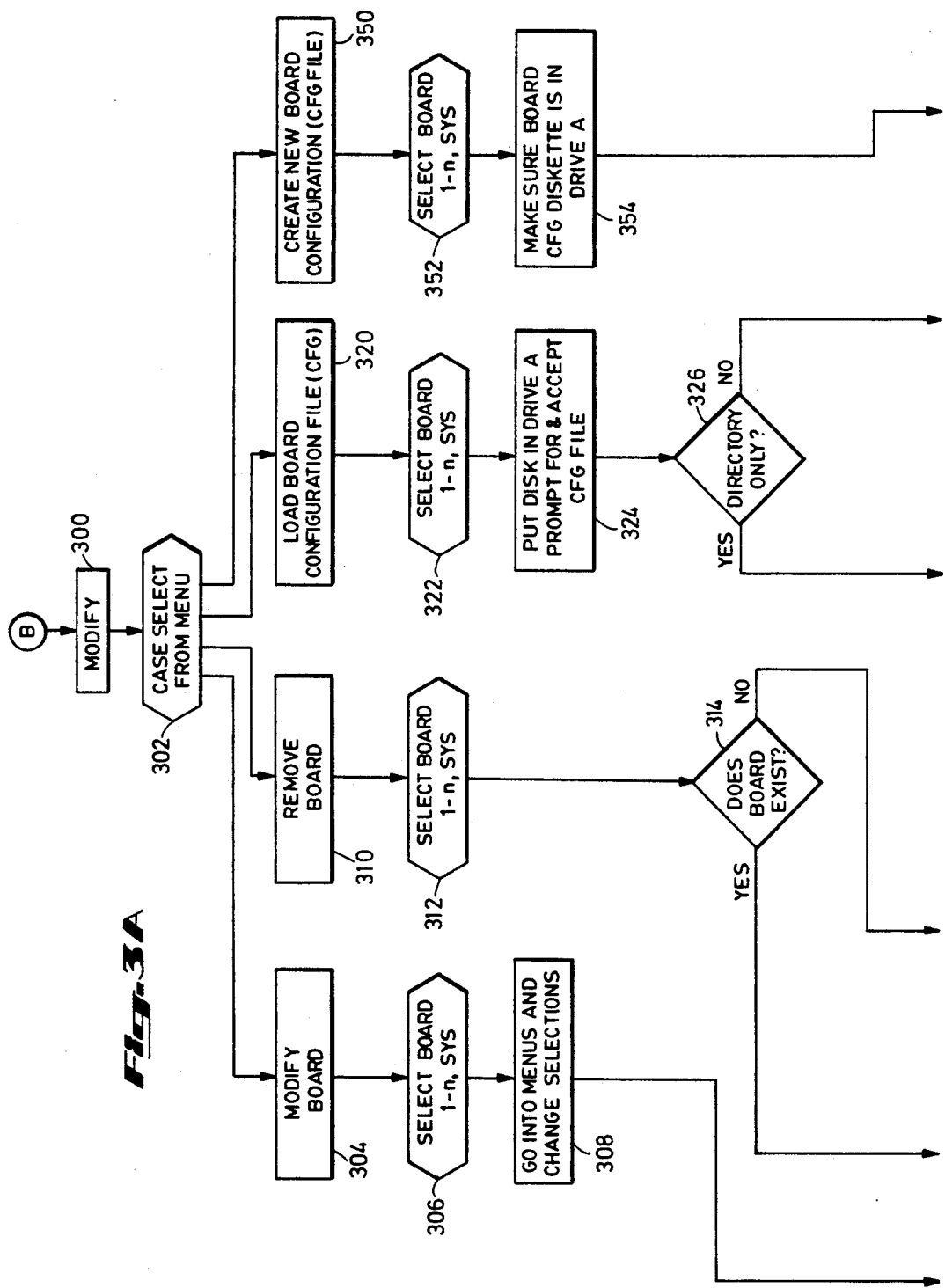

ADAPTER BOARD ORIENTATION

FIG. 7B NORMAL SWITCH: 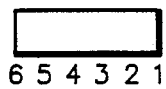
REVERSE SWITCH:  
FIG. 7D NORMAL VERTICAL SWITCH: 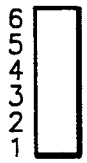
REVERSE VERTICAL SWITCH:  
FIG. 7F PAIRED JUMPER (NORMAL): 
FIG. 7G TRIPOLE JUMPER (REVERSE): 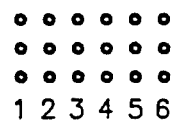
TRIPOLE JUMPER (REVERSE, VERTICAL):  
FIG. 7I INLINE JUMPER (REVERSE): 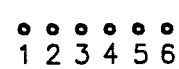

COMPUTER IMPLEMENTED METHOD AND APPARATUS FOR DYNAMIC AND AUTOMATIC CONFIGURATION OF A COMPUTER SYSTEM AND CIRCUIT BOARDS INCLUDING COMPUTER RESOURCE ALLOCATION CONFLICT RESOLUTION

This is a continuation-in-part of copending application Ser. No. 293,315, filed Jan. 4, 1989, which is a continuation-in-part of copending application Ser. No. 242,734, filed Sep. 9, 1988, now abandoned.

BACKGROUND OF THE INVENTION

1. Field of the Invention

The present invention relates to computer systems having interchangeable circuit boards and more particularly to configuration of the circuit boards for use in a particular computer system.

2. Description of the Prior Art

Microprocessors with enhanced speed and size have made it possible to develop and utilize a variety of sophisticated memory and input/output devices located on circuit boards. The use of interchangeable circuit boards has allowed lower cost, highly flexible computer systems to be developed. A desired basic computer system including a microprocessor and a system board containing connectors for receiving the circuit boards is obtained by the user. The user then adds the desired circuit boards having the desired memory and input/output features of the completed computer systems. In this way individualized computer systems can be easily and efficiently developed.

The circuit boards associated with the sophisticated memory and input/output devices make complex demands on the computer system resources, particularly of the limited common computer resources such as interrupt request lines, direct memory access (DMA) channels and input/output and memory address space. Additionally, the circuit boards often require internal initialization or the selection of internal options to meet the desired conditions.

Configuring a variety of circuit boards in one computer system leads to potential configuration conflicts and complex decisions, particularly as the complexity of the circuit board increases or the installer's experience decreases. Various choices must be made for selecting interrupt lines, DMA channels and address locations which do not conflict with those of another circuit board. After the choices have been made, often based on reading highly cryptic or obscure manuals, the actual configuration must be done. In previous circuit boards, setting the interrupt, DMA and address options generally entailed setting the correct switches or jumpers, again as indicated by the manual. Initialization of software activated options had to be included in special initialization procedures or set at the beginning of the desired applications package.

As a result, configuration was very complex and time consuming, particularly for relatively unskilled users or for experienced systems integrators when using new circuit boards.

SUMMARY OF THE INVENTION

This invention provides a method for configuring a computer system and circuit boards to access common computer system resources such as interrupt lines, DMA channels and addresses when the computer system provides for the circuit boards to be interchangeably inserted into a plurality of system slot locations. This invention determines the available configuration options and their associated settings of the circuit boards installed or to be installed in the system, with each configuration option and associated setting being specified in terms of one or more parameters. This invention additionally may determine board initialization parameters and the slot location in which a board is inserted or is to be inserted.

When more than one configuration option and setting is specified for a circuit board, each option being defined by a set of parameters, this invention selects one option from the plurality of choices so that the system can configure the boards to operate without conflicts of the common resources. In all likelihood, the user's first request will be to configure the system with all boards enabled. If such is impossible, the user may then choose to delete or disable certain boards. In fact, if the user's system cannot configure with all boards enabled, the user may adopt several alternate configuration patterns based upon different user specifications that are a function of the user's need for the system functionality at the time.

The present invention is directed toward a method and apparatus used to allocate common computer resources to circuit boards installed in the computer system and to resolve conflicts which may arise in the allocation of resources. The present invention may be used to configure a new system. The present invention assigns priorities to the plurality of choices based upon the resource type, the nature of the request and its relationship to other requests. The requests are sorted into a prioritized list and resources are allocated on a priority basis. When conflicts arise, the present invention will attempt to resolve the conflict by assigning alternate resources to the conflicting entry. Should this fail to resolve the conflict, the present invention will examine the conflicting request, the prior request with which it is in conflict, and determine which of the requests or their related requests must be changed to resolve the conflict. If the conflict can not be resolved, the present invention will notify the user that it cannot be resolved and point out the resource request which are in conflict.

Certain configuration information based upon the selected options is stored for use in running the computer system. This information may be stored in the computer system's own non-volatile memory, such as battery-powered CMOS random access memory, and/or in a diskette file.

This invention includes at least three methods for determining what are the configuration options and associated settings for access to common computer system resources of the circuit boards. The invention includes the establishment of a configuration file format for indicating the circuit board option and setting parameters. This format accommodates parameters for access to common computer system resources and for a circuit board's initialization requirements. This configuration file format is made available to board manufacturers, who preferably would provide with their circuit board's configuration file according to this established format which includes the appropriate configuration and initialization options and settings. Manufacturers supplying a configuration file with a circuit board would ease system configuration problems for the user.

Additionally, the computer system manufacturer will establish a database or collection of configuration information or configuration files for selected circuit boards. This collection of configuration files is supplied to the user with a configuration program so that a user can look up the particular boards to be configured in the user's system and extract the needed configuration file information if the manufacturer does not supply a configuration file or the file is not available.

In the case of circuit boards for which the manufacturer does not supply a configuration file or the file is not available and for which there is no configuration information in the system manufacturer's supplied collection, this invention provides a utility for creating a configuration file containing the parameters comprising the one or more options and settings of the board to access common computer system resources and/or board initialization values. To aid the user in creating the configuration file, the system provides an initial template of a configuration file in which all parameters that have default values (and a default value is established for all circuit board parameters that have a finite number of options) are already filled in with the default value in place. The user in creating the configuration file may simply augment and/or modify the template supplied until all the options, settings and initialization parameters are incorporated.

BRIEF DESCRIPTION OF THE DRAWINGS

FIGS. 1, 1A, 2, 3A, 3B, 4 and 6 are flowchart illustrations of portions of the operating sequences and menus of a method and apparatus according to the present invention.

FIGS. 7A, 7B, 7C, 7D, 7E, 7F, 7G, 7H, and 7I are representations of board orientation and switch and jumper orientations and orders.

DESCRIPTION OF THE PREFERRED EMBODIMENT

Figure 1:
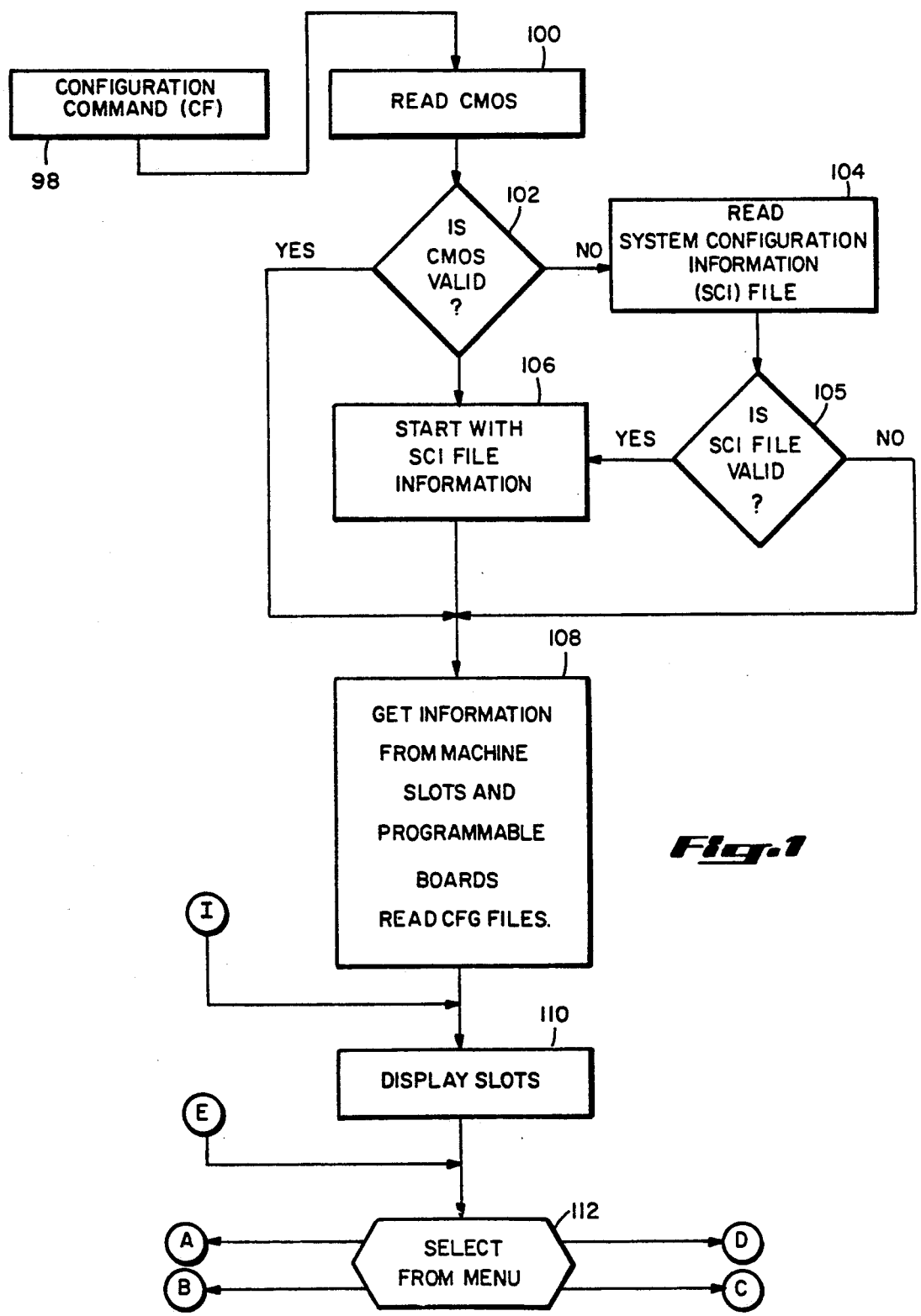

The following disclosures are hereby incorporated by reference:

U.S. application Ser. No. 243,327, entitled "Multiple Word Size Computer Interface with Master Capabilities" by Paul R. Culley, filed on Sep. 9, 1988; now U.S. Pat. No. 5,109,332, issued on Apr. 28, 1992;

U.S. application Ser. No. 378,580, entitled "Computer System with Simplified Master Requirements" by Paul R. Culley, filed on Jul. 10, 1989; now U.S. Pat. No. 5,165,037, issued on Nov. 17, 1992;

U.S. application Ser. No. 243,480, entitled "Computer System With High Speed Data Transfer Capabilities" by Paul R. Culley, filed on Sep. 9, 1988; now U.S. Pat. No. 5,058,005, issued on Oct. 15, 1991;

U.S. application Ser. No. 378,579, entitled "Computer System with High Speed Data Transfer Capabilities" by Paul R. Culley, Filed on Jul. 10, 1989; now U.S. Pat. No. 5,159,679, issued on Oct. 27, 1992;

U.S. application Ser. No. 242,728, entitled "Extended Input/Output Circuit Board Addressing System" by Paul R. Culley and Montgomery McGraw, filed on Sep. 9, 1988; now U.S. Pat. No. 4,999,805, issued on Mar. 12, 1991; and U.S. application Ser. No. 242,954, entitled "Programmable Interrupt Controller" by Paul R. Culley, Montgomery McGraw, Karl N. Walker and Lazaro D. Perez filed on Sep. 9, 1988, now abandoned and continued to U.S. application Ser. No. 07/691,169; now U.S. Pat. No. 5,101,497, issued on Mar. 31, 1991, all of which are assigned to the assignee of this invention.

The present invention provides the means for automatically determining, and optionally setting, the configuration of circuit boards utilizing common computer system resources such as interrupt lines, DMA channels and addresses. Determination of board configuration information is central to the efficient operation of the preferred embodiment. With this invention, circuit board manufacturers can include configuration files with their circuit board products to speed the product and system configuration process. These configuration files can be included with new fully programmable circuit boards or with conventional switch or jumper configured circuit board products. It is concluded that these manufacturer-supplied, machine readable configuration files will become a requirement with fully programmable circuit boards to allow efficient use of set up time and optimal use of circuit board capabilities.

Alternatively, the configuration information can be contained in and accessible from a database or collection of configuration information or configuration files supplied by a computer system manufacturer or the information can be developed interactively with the user and stored in a new configuration file.

However derived, the configuration information is used at system configuration time by the preferred embodiment, in a manner described below, to resolve any conflicts in the assignment of common computer system resources such as interrupt lines and DMA channels. These files are also used in the preferred embodiment to develop and store the information necessary for system board and circuit board initialization. The information contained in the configuration file of the preferred embodiment, its format and its usefulness will be described first. Having described a configuration file, the method and means for determining the file, configuring the system and storing the configuration information of the preferred embodiment will be described.

The information in the configuration file consists of a series of parameters which serve two general purposes: common computer system resource allocation and circuit board initialization. Several parameters may specify common computer system resources used by a circuit board. These parameters may further specify various options for access to system resources that the board may use. For example, a file may contain the different number and type of interrupts that a board is capable of using. As described below, these parameters are used by the preferred embodiment of the present invention during the automatic computer system configuration process to ensure that the common computer system resources, such as memory address ranges, I/O address ranges, interrupt levels, and DMA channels used by a circuit board do not conflict with those other computer system devices.

The second type of parameter concerns local circuit board specific operation alternatives; these parameters do not deal with common system resources. They determine how the board can be configured upon system initialization. For example, these parameters might include the baud rate, word length and parity selection for an asynchronous serial communications device. These parameters allow selection, at system configuration time, of the board operation alternatives which will be selected during initialization. The selected alternatives are then used to derive the information that the computer system initialization sequence uses to initialize the circuit board. For example, using these parameters, a memory board may be configured with portions of its memory partitioned among the conventional, extended and expanded memory areas available in products utilizing the operating system generally referred to as MS-DOS developed by Microsoft Corporation. When used in a computer system having this capability, an expansion memory board can easily support any operating system without dealing with the limitations of each operating system.

In the preferred embodiment, a product identifier is preferred for circuit boards that are interchangeably insertable in a plurality of slot locations in the computer system and which boards utilize an addressing method that depends on their slot location. The identifier assists in determining the slot in which a board has been installed. Once located, the board can be programmed with the configuration parameters specified in the configuration file and chosen by the user at system configuration time.

Specifically, according to the preferred embodiment of the present invention, the common computer system resource parameters in a configuration file include memory address ranges, I/O address ranges, interrupt line assignment and triggering, and DMA channels.

Memory address range parameters specify both the optional and required memory ranges utilized by a board. General characteristics of the memory ranges, such as cacheability or read-only capability, are also included for each range. For boards that require I/O addressing, the choices of input/output ranges that the board can use are specified in the parameters. Parameters are provided to specify the number of interrupts required as well as the specific interrupt choices supported by a board. A board capable of supporting shareable, level-triggered interrupts can have that option specified as one of the interrupt choices. Parameters can also specify the number of DMA channels as well as the specific DMA channel choices supported by a board.

According to the preferred embodiment of the present invention, in addition to common computer system resource parameters, the configuration file can specify a number of board-specific operational parameters. Each parameter can include a number of alternative selection values from which a user can choose a desired board operation. A default value which can be provided for each parameter should reflect the most typical and frequent use of the product. Each specific operational parameter should specify the I/O address, bit pattern and value that must be used to initialize each of the alternative selections.

The preferred embodiment of the present invention utilizes the following overall configuration file format:
Board Identification Block;
Initialization Information Block(s); and
Function Statement Block(s).

The Board Identification Block contains the identifier of the board and must be the first block. The Initialization Information Blocks contain the information about the port, switch or jumper setting or initialization values and locations used to configure the board. The Function Statement Blocks contain a description of the board's functions and the common system resources that must be and can be used by the board.

The following is an example of a Board Identification Block:
ID="7 character ID"
NAME="description"
MFR="manufacturer"
CATEGORY="Board category"
[SLOT=ISA8|ISA16|ISA80R16|EISA|EMB(n)-|VIR]
[LENGTH=VALUE]
[SKIRT=YES|NO]
[READID=YES|NO]
[LANGUAGE=EN|FR|GR|IT|SP]
[CODE="filename.OVL"]
[COMMENTS="information"]
[HELP="information"]

where the information within quotation marks is free form text and the information within square brackets is optional. Items which are separated by a "|" indicate that only one choice of those indicated is allowed. A space separating items indicates that all the items are included.

The required ID field contains a seven character product identifier, or ID. This ID is used to uniquely identify the board and to name the configuration (CFG) file. In the preferred embodiment, the ID consists of a three-letter code derived from the manufacturer's name, a two-character hexadecimal product identifier, and a two character hexadecimal revision number.

NAME is a required field containing text identifying the product. Manufacturer and product name should be included. Revision and part numbers may also be included.

MFR is a required field containing text identifying the board's manufacturer.

CATEGORY is a required field containing a coded board category. The category is a three letter code, preferably chosen from the following list.
COM: Communications Board
MEM: Memory Expansion Board
MFC: Multi-function Board
MSD: Mass Storage Device
NET: Network Board
NPX: Numeric Coprocessor Board
PAR: Parallel Port Board
PTR: Pointing Device
SYS: System Board
VID: Video Adapter Board
OTH: Other The optional SLOT field contains a list of slot sizes and types that the board can use such as: 8, 16, or 32 bit, conventional or extended architecture. The default is ISA16. A slot value of EMB(n) indicates an embedded slot, used when a resource resides on another board, typically the system board. Embedded slots are slot specific as later defined and are slots that are not physically available on the system board. A SLOT =EMB(o) indicates that this file is the system board configuration file, which has a special meaning as will be explained later. A slot value of VIR indicates a virtual slot, which allows peripherals to be added to installed boards such as disk controllers and allows functions or devices which reside on the system board to appear separately. Virtual slots may also contain resource information for software drivers, such as extended memory managers, that require resources. Virtual slots preferably cannot use slot specific addressing and do not have readable ID's.

The optional LENGTH field specifies the board length in whole millimeters. The optional SKIRT field indicates whether the board has a lower extension or skirt which prevents its installation in certain slots. The default value is NO. The READID field is an optional field with a default of NO to indicate if the board has a readable identification value.

The LANGUAGE field is optional and indicates the language of the CFG file. The default is English, with preferably allowed values of EN, FR, GR, IT, SP for English, French, German, Italian and Spanish, respectively.

The CODE field is an advanced feature and allows for inclusion of vendor or manufacturer specific program segments. This may be useful if the integrator or user must enter passwords to allow operation of the system. Other useful cases include when any configuration information needed for the board is not located in the standard locations provided by the system board and when specific code must be used to determine the presence of particular hardware. Each vendor specific program segment has five executable modules contained into a single file which is referenced by the filename.OVL parameter value. Preferably the filename is the board ID, so that the configuration file and the vendor specific file have similar filenames.

The first module in the vendor specific program is the table program which provides a table of starting addresses for the remaining modules and data block pointers to the configuration means. The second module is the initialization module. The initialization module is executed before the configuration means tries to configure the system. The initialization module does any necessary checking of system hardware, obtains any information necessary from the integrator and builds a small, simple configuration file fragment to return to the configuration means so that the configuration means can know the available functions and needed resources of the board. The configuration file fragment may contain Initialization Identification and Function statement blocks but does not contain a Board Identification Block, that being previously supplied in the main configuration file. The configuration file fragment is text forming the missing portions of the main configuration file of the board.

The third module is the change module and is used when the integrator wishes to change a function or a choice, generally only used to resolve an otherwise unresolvable conflict. Information is saved on what changes are made to allow the changes to be undone if desired. The changed information is also provided to the remaining portions of the configuration means as necessary.

The fourth module is the update module which allows the configuration information to be saved. The information is either placed in the appropriate memory directly or stored in the system definition information data segment maintained by the main portions of the configuration means.

The fifth and final module is the undo module which allows the integrator to undo the change just made or to return to the default values provided.

This vendor specific file handling and interface defines a simple manner for allowing a vendor or manufacturer to develop hardware which requires specific programs for their interpretation and yet allows the system to do a proper resource configuration to prevent conflicts.

The optional COMMENTS field contains information that will be displayed when the board is selected. The comments must be enclosed in quotation marks and can contain encoded embedded tabs and linefeeds. The COMMENTS field has this meaning for all statements.

The optional HELP field contains textual information that will be displayed should the user request help during system configuration. The HELP field has this meaning for all statements.

As previously mentioned, the system board configuration file is slightly different because it contains an extra identification block, the System Board Identification Block. The additional block is necessary because additional information must be obtained on the system board itself. The System Board Identification Block is placed after the Board Identification Block and has the following general syntax:

```
SYSTEM
    EISACMOS = value
    SLOT(1) = ISA8 | ISA16 | EISA
        LENGTH = value
        [SKIRT = YES | NO]
    .
    .
    .
    SLOT(n) = ISA8 | ISA16 | EISA
        LENGTH = value
        [SKIRT = YES | NO]
```

The required EISACMOS field has a parameter indicating the amount of nonvolatile, preferably battery powered CMOS, memory available for slot specific uses. The SLOT(i) statement identifies the particular slot number and the type of slot, that is, whether it can receive a conventional architecture 8 or 16 bit board or can receive an extended architecture board. The associated required LENGTH statement specifies, in millimeters, the longest board that can be held in that slot. The associated, optional SKIRT statement indicates whether a board having a lower extension or skirt can be installed, with a default of YES. The SLOT statement and associated LENGTH and SKIRT statements are repeated until all the slots present on the system board have been identified.

The following portion of a CFG file illustrates how the Board Identification Block of an ACME Manufacturer multifunction circuit board containing one printer and one serial port would appear.

ID="ACM0117"
NAME="MULTIFUNCTION BOARD"
MFR="ACME MANUFACTURER"
SLOT=ISA8
SKIRT=YES
CATEGORY="MFC"
COMMENTS="The ACME multifunction board supplies serial and parallel port functions."

Information Initialization Blocks can consist of four types of statements, those associated with programmable I/O address locations, those for switches, those for jumpers and those for software. The Information Initialization Block for programmable boards contains the IOPORT(i) statement, which includes the I/O address locations used, how they are addressed, and what the initial value might be. The following figure shows the general syntax of an IOPORT(i) statement.

IOPORT(i)=address or PORTVAR(i)

[SIZE=BYTE|WORD|DWORD]
[INITVAL=value].

The IOPORT(i) statement indicates which address location is to be used, the i being an index identifying the IOPORT statement, not a specific system slot. These I/O address locations can be listed as slot specific locations, where a 0Z prefix indicates a slot specific location, or can be non-specific locations. The same address can be used in several IOPORT(i) statements, allowing a sequence of values to be written to the same address.

As an advanced feature, the address can be supplied indirectly by using the PORTVAR(j) argument, where j is an index to identify the PORTVAR reference. The address is later assigned to the PORTVAR(j) reference in a CHOICE statement, which will be defined, where the following general syntax is used:

PORTVAR(j)=address

This feature allows added flexibility when various choices such as serial ports or printer ports are being configured.

The optional SIZE field gives the width of data associated with the address location, either 8, 16 or 32 bits, and has a default of BYTE. The optional INITVAL field contains the binary bit mask for the location. The bit mask can have four different values at a given bit location. Values of 0 or 1 indicate that the bit must be set at that value. A value of an r indicates that the bit value will first be read from the I/O port and then the read value written back. A value of an x or X indicates that the bit will be set by the configuration program. If a bit value is omitted, the value written will be what was read, unless it is to be set by the configuration program.

The Initialization Information Block for switch programmable boards contains the SWITCH(i) statement. The following figure shows the general syntax of an SWITCH(i) statement:

SWITCH(i)=n
NAME="switch name or description"
STYPE=DIP ROTARY SLIDE
[VERTICAL=YES NO]
[REVERSE=YES NO]
[LABEL=LOC(switchlist) textlist]
[INITVAL=LOC(switchlist) valuelist]
[FACTORY=LOC(switchlist)valuelist]
[COMMENTS="configuration comments"]
[HELP="information]

The SWITCH(i) statement indicates the number of switches in the set or switch positions in the switch, with the i being an index identifying the particular SWITCH statement. The required NAME field is the manufacturer's name for this control block. The required STYPE field indicates whether the switch is a DIP switch, a set of switches having two positions, ON and OFF; a ROTARY switch, having a number positions arranged in a circle; or a SLIDE switch, having a series of positions in a straight line. The VERTICAL field is optional and indicates the orientation of the switch and has a default of NO (FIGS. 7B to 7E). The optional REVERSE field indicates the orientation of the switch, that is reversed, such as 1234, or normal, such as 4321.

The optional LABEL field explains the labels used on the board by the manufacturer to label the switches. The switchlist parameter is the list of switches being referenced and is either a series of numbers representing switches in ascending or descending order separated by spaces or a range of numbers specified by two numbers separated by a hyphen. The textlist parameter is a series of text strings in quotation marks and separated by spaces, with the number of strings in the series equalling the number of switches specified by the switchlist parameter.

The optional INITVAL field is used to specify the value of reserved switches in a set. The valuelist parameter is a bit string with a value of 1 or 0 for each bit as appropriate, with the numbers of bits equalling the number of switches specified by the switchlist parameter of the INITVAL field. If the field is omitted the switches are assumed to be set by the configuration program or the position of the switch doe not matter.

The optional FACTORY field is a mask of the default settings for the switches. The use of the INITVAL and FACTORY fields are particularly important for switches that control a undocumented option, but are required to be in a specific state.

The Jumper Identification Block general syntax is as follows:

JUMPER(i)=n
NAME="jumper name or description"
JTYPE=INLINE|PAIRED|TRIPOLE
[VERTICAL=YES|NO]
[REVERSE=YES|NO]
[LABEL=LOC(jumperlist) textlist]
[INITVAL=LOC(jumperlist) valuelist]
[FACTORY=LOC(jumperlist) valuelist]
[COMMENTS="information"
[HELP="information"]

Figure 7A:
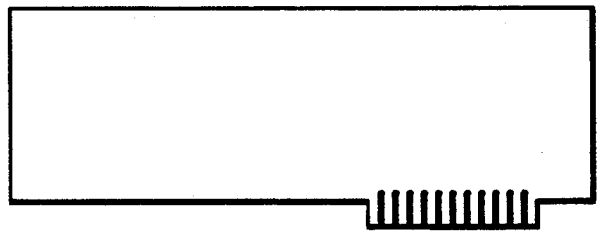
Figure 7C:
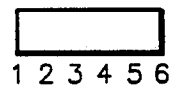
Figure 7E:
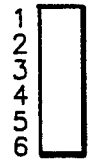
Figure 7H:
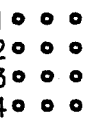

The JUMPER(i) statement defines the number of jumper positions in the set, with the i being an index identifying the particular JUMPER statement. The NAME, COMMENTS and HELP fields are similar to their so named counterparts in the Switch Identification Block. The required JTYPE field defines the type of jumper being referenced. INLINE jumpers (FIG. 7I) are arranged in a single line to be connected from one post to the next post. PAIRED jumpers (FIG. 7F) are arranged as a series of double posts, with connections made across the posts. TRIPOLE jumpers (FIGS. 7G, 7H) are arranged as a series of triple posts, with each jumper having two possible settings. The VERTICAL and REVERSE fields are equivalent to the like named switch fields.

The LABEL field in the Jumper Identification Block is equivalent to the LABEL field in the Switch Identification Block, with the jumperlist parameter listing the jumpers being referred to. Paired and tripole jumpers are defined by a number, with the jumperlist being similar to the switchlist. Inline jumpers are defined differently with numbers identifying the individual posts and two numbers separated by a caret identifying a jumper position, with ranges not allowed.

The INITIAL and FACTORY fields have functions similar to the same fields in the Switch Identification Block, but the states are defined somewhat differently. For a paired jumper or an inline jumper, a 1 indicates that the jumper is present, while a 0 indicates it is not present. In a tripole jumper a 1 indicates the jumper is in the upper position for horizontal jumpers or the right position for vertical jumpers, a 0 indicates the jumper is in the lower position or left position and an N indicates the jumper is not present. For all jumpers an X indicates a don't care state.

The fourth type of identification block is the Software Identification Block with the following general syntax:

SOFTWARE(i)="software description"

The i is used in the SOFTWARE statement to distinguish the various SOFTWARE statements in the Initialization Information Block. When the computer system is being configured the text forming the software description is displayed to the user as directed by the INIT statement, which is defined later. The SOFTWARE statement allows the manufacturer to indicate to the user that certain device drivers, resident programs, setup programs or other programs or codes must be included in the CONFIG.SYS file, in the AUTOEXEC.BAT file or as switches for programs which must be run.

COMMENT and HELP statements may be included with the IOPORT and SOFTWARE statements, but have not been used in the preferred embodiment because no integrator action is needed based on those statements and the file structure is simpler without them.

As a specific example of an Initialization Information Block, please see the following:

```
;INITIALIZATION INFORMATION BLOCK
IOPORT(1)=0ZC81h
    SIZE=BYTE
    INITVAL=rr10xxxx
    SWITCH(1)=8
        NAME="SWITCH BLOCK 1"
        STYPE=DIP
        REVERSE=YES
        INITVAL=LOC (2 3) 1 1
        FACTORY=LOC (1-8) 01101111
    JUMPER(1)=7
        NAME="JUMPER BLOCK 1"
        JTYPE=INLINE
        REVERSE=YES
        LABEL=LOC (1 2 3 4 5 6 7 8) "SW1" "SW2"
            "SW3" "SW4"
        FACTORY=LOC (1 2 3 4 5 6 7 8) 0110
```

The Function Statement Block includes the description of the function or functions that the board performs, along with the common system resources required by the function. Because several functions can be integrated onto a single board, the CFG file can include several FUNCTION statement blocks. A different FUNCTION statement would be used for different functional areas on a single board, such as printer control, serial control, or video control. Within each function block, different choices about the resources may be available. These choices include descriptions of the resources required if that choice is selected. These choices allow a way for the configuration program to eliminate conflicts. Below is an example of the framework or syntax of a function block.

```
FUNCTION="name"
    [TYPE="function type"]
    [CONNECTION="location"]
    [COMMENTS="information"]
    [HELP="information"]
    CHOICE="name"
        Resource Description Block
    [CHOICE="name"]
        [Resource Description Block]
    [SUBFUNCTION="name"]
        [TYPE="function type"]
        [COMMENTS="information"]
        [HELP="information"]
        [CHOICE="name"]
            [Resource Description Block]
    [SUBFUNCTION="name"]
        [TYPE="function type"]
        [COMMENTS="information"]
        [HELP="information"]
        [CHOICE="name"]
            [Resource Description Block]
```
The FUNCTION statement itself includes text about the nature of the board and information about the resources that the board requires. If the board requires several FUNCTION statements, each one describes the subset of the board functionality it is configuring.

The optional TYPE statement is used to identify a function or device on the board. The function type is a text string, preferably upper case. The function type may be transferred to the computer system's CMOS RAM for later interrogation by a program, particularly where the information can be used by a specific application program to tailor its operation. To help develop uniformity certain function types can be defined, with preferred definitions in the following list. The more generic function is listed first, with a more detailed function present following a comma delimiter.

| Device Type | Device Description |
|---|---|
| COM,ASY | Standard ISA compatible serial controller |
| COM,ASY,FIFO | NS16550A based serial ctrl. with FIFO |
| COM,SYN | Synchronous communications controller |
| COM,ASY,SYN,SDLC, BSC,HDLC | Multi-function communications card supporting async, SDLC, bisync, and HDLC protocols |
| PAR | ISA compatible parallel port controller |
| PAR,BID | ISA parallel port with bidirectional mode |
| PTR,8042 | Standard 8042 pointing device |
| NPX,287 | Intel 287 numeric coprocessor |
| NPX,387 | Intel 387 numeric coprocessor |
| NPX,387SX | Intel 387 numeric coprocessor, SX version |
| NPX,W1167 | Weitek 1167 numeric coprocessor |
| NPX,W3167 | Weitek 3167 numeric coprocessor |
| KEY,nnn,COU=xx | Standard keyboard nnn = number of keys (083,084,101, or 103) xx = keyboard country code (US,UK,FR,GR,IT,SP, LA,SV,SU,NL,DK,NO,PO, SF,SG,CF, or BE) |
| VID,MDA | Standard mono adapter |
| VID,MDA,HERC | Standard Hercules mono adapter |
| VID,CGA | Standard CGA adapter |
| VID,CGA,ATT400 | CGA with AT&T 640×400 superset |
| VID,EGA | Standard EGA adapter |
| VID,VGA | Standard VGA adapter |
| MSD,DSKCTL(1) | Primary standard AT-compatible disk ctl. |
| MSD,FPYCTL(1) | Primary standard 765 floppy controller |
| MSD,TAPCTL(1) | Primary tape controller |
| OTH,JOY | Miscellaneous entry (OTHer) identifying a joystick card |

The CONNECTION statement is an optional statement which allows the location of the connector for that particular function to be shown to the integrator.

The location is the text parameter supplied the text parameter supplied and is preferably a short string.

The optional COMMENTS field contains information that appears when the function is selected. COMMENTS after a specific function appear only when the associated function is selected.

The CHOICE statements place resource values into logical groups. At least one CHOICE statement is required. Subsequent CHOICE statements are optional. The name field describes the choice and appears when the choice is selected. For example, if the function were a serial port, the choices might be "COM1, "COM2", and "Disable Port." Each choice can require a different set of common system resources and a different initialization value. In the preferred embodiment the most desired choice is placed first, with the remaining choices being included in preferred priority order. The configuration means uses the first nonconflicting CHOICE it encounters.

The SUBFUNCTION statement is considered an advanced feature and can be used if a given function has several configurable pieces. The general syntax for a SUBFUNCTION statement is the same as the syntax for a FUNCTION statement, with the exception that further subfunctions cannot be included. It is noted that the FUNCTION statement can have its own TYPE, COMMENTS and HELP statements, and CHOICEs in addition to those present in the SUBFUNCTION statements. An example using various advanced features is shown later.

Resource Description Blocks appear as part of a CHOICE statement. The Resource Description Block listed within a CHOICE statement contains the resources associated with that CHOICE. Depending on the board being described, the Resource Description Blocks could include the following types of resources: DMA channel requests and programming; interrupt channel requests and programming; I/O address definitions; memory size and configuration; and initialization values and switch and jumper settings.

The general syntax for a Resource Description Block is as follows:
    [SUBTYPE="choice type"]
    [DISABLE=YES NO]
    [HELP="information"
    [Resource Statements]
    [INIT statements]

The optional SUBTYPE field is used in conjunction with the TYPE statement to provide yet more information regarding the particular function being performed by the board. The text in the SUBTYPE field can be appended to the text in the TYPE statement for reference by other programs. For example, if the TYPE statement is TYPE="COM,ASY", the SUBTYPE fields in different Resource Description Blocks could be SUBTYPE="COM1" and SUBTYPE="COM2" to indicate the serial channel to which that particular board was configured.

The DISABLE statement indicates if that CHOICE disables the function. This statement allows the configuration means to identify this as the least desirable choice and use this choice only if an otherwise unresolvable resource conflict develops. The default value is preferably NO.

The Resource Statements list the system resources that will be used if that CHOICE is selected. These statements identify the particular DMA channel, interrupt line, I/O port and memory address resource values to be used in the configuration process. The INIT statements are generally related to the Resource Statements and provide the actual values to be used with programmable boards and the settings for nonprogrammable boards for the associated Resource Statement. Grouping or the relationship between the Resource Statements and the INIT statements is discussed later.

There are four currently defined types of Resource Statements, based on the need to allocate DMA channels, I/O ports, interrupt lines and memory address space. If more allocatable resources are contained on the computer system, appropriate Resource Statements can be developed. The four currently defined Resource Statements are the DMA statement, the PORT statement, the IRQ statement and the MEMORY statement. Below is illustrated a DMA statement in general terms.
    DMA=list
        [SHARE =[YES|NO] "SHARE TEXT"]]
        [SIZE=BYTE|WORD|DWORD]
        [TIMING=DEFAULT|TYPEA|TYPEB|TYPEC]

The requested DMA channels appear in the list. The optional SHARE field indicates whether the function is willing to share this DMA channel and has a default of NO. The SHARE field could be YES if, for example, the floppy controller and tape drive used the same channel. Alternately, the share field may take on a text value or "share text." Share text is used to indicate when a resource is intended to be shared. Two or more statements having identical "share text" will be allocated the same resource. The optional SIZE field indicates the width of the data transferred by the DMA channel. The computer system being configured preferably supports several different DMA timings. The optional TIMING field specifies which of these different timings is used by the DMA channel.

For a specific example, assume the ACME Manufacturing tape controller board can use DMA channel 3 or 5 and it can share the chosen channel. The ACME tape controller uses 16-bit DMA transfers, and can support TYPEB timing. The following portion of a CFG file shows the values for the ACME board.
    DMA=3|5
        SHARE=YES
        SIZE=WORD
        TIMING=TYPEB Below is shown the general format of the PORT statement.
    PORT=rangelist [STEP=value] [COUNT=value]
        [SHARE=[YES|NO] ["SHARE TEXT"]]
        [SIZE=BYTE|WORD|DWORD]

The rangelist identifies the address of the port and can be a single value or a range of values. If a range is used, a STEP field may be supplied. The STEP field indicates the number of ports desired and the increment which is to be used in searching for available port space. If the number of ports desired is different than the increment size, the COUNT field may be added to indicate the number of ports, the STEP field then indicating the searching step size. A STEP field is necessary before a COUNT field is used and if neither is used, all ports in the range are requested. The SHARE and SIZE fields have the same meaning as in the DMA statement.

For specific examples, assume the board utilizes an addressing technique wherein the 1/0 space address location is at least partially dependent on the installed slot location as used by the central processor to increase the amount of non-conflicting I/O space available, with the addresses being represented by 0ZXXh, the representing the hexadecimal digit indicating the number of the slot containing the board, this technique being referred to herein as slot specific addressing.

PORT=0Z00-0Z0Fh

This example indicates that the entire range of 16 ports from 0Z00n to 0Z0Fh will be used.

PORT=0Z00h-0Z0Fh STEP=4

This example indicates that four ports are to be used, in any of the following ranges: 0Z00h-0Z03h, 0Z04h-0Z07h, 0Z08h-0Z0Bh, 0Z0Ch-0Z0Fh.

PORT=0Z00h-0Z0Fh STEP=4 COUNT=2

This example indicates that two ports are desired but the step size must be four with the following ports available for use: 0Z00h-0Z01h, 0Z04h-0Z05h, 0Z08h-0Z09h, 0Z0Ch-0Z0Dh.

Below is shown the general format of the IRQ Statement.

IRQ=list
　[SHARE=[YES|NO] "SHARE TEXT"]]
　[TRIGGER=LEVEL|EDGE]

The requested interrupts appear in the list. The optional SHARE field indicates whether the function is willing to share this interrupt. The default is NO. The optional TRIGGER field specifies whether the interrupt is level or edge triggered, with the default being EDGE.

For a specific example, assume the ACME Manufacturing tape controller needs two interrupts. It can use interrupts 11 and 12 or 14 and 15, but it can not share the assigned interrupts. The ACME tape controller needs the chosen interrupts to be edge triggered.

IRQ=11 12|14 15
SHARE=NO
TRIGGER=EDGE

Below is shown the general format of the MEMORY Statement, which defines the amount, location and other characteristics of a memory board.

MEMORY=rangelist [STEP=value]
[ADDRESS=rangelist [STEP=value]]
　[WRITABLE=YES|NO]
　[MEMTYPE=SYS|EXP|OTHER]
　[SIZE=BYTE|WORD|DWORD]
　[CACHE=YES|NO]
　[SHARE=YES|NO]

The memory Statement is used to define the range of memory on a board. Generally memory boards allow various amounts of memory to be installed on the board. Thus the rangelist can be a series of values or a range as indicated by two values separated by a hyphen. If a range is specified, a STEP field can be used to indicate the smallest increment by which memory can be added to the board.

The ADDRESS field specifies the address of the memory. If a single address is given, the memory must be located there. A rangelist can be a list of addresses at which the memory can be located or can be a range indicating that the memory can start at the first available location in the range as long as the memory can be entirely contained in that range. If a range is specified, the STEP statement provides the granularity of the memory, that is, the value used to change the attempted memory start location. The WRITABLE field indicates whether the memory is random access (RAM) (YES) or read only (ROM) (NO), with a default of YES. The MEMTYPE field specifies whether the memory is SYStem (memory located in the physical address space of the microprocessor), EXPanded (memory available to be used by expanded memory managers operating, for example, according to the EMS 3.2 or 4.0 specifications), or OTHER (memory not managed by the operating system, such as expanded memory page frames, memory mapped I/O and bank-switched memory).

The SIZE field indicates the data width of the board. The CACHE field indicates whether this memory can be cached. The memory on a graphics board, for example, would not be cached. The default for the CACHE field is NO. The SHARE field indicates whether the memory address space can be shared and has a default of NO.

Two simple examples of MEMORY statements follow.

MEMORY=128K
ADDRESS=0E000h
　WRITABLE=NO
　MEMTYPE=SYS

This example describes a 128K ROM located only at address 0E000h.

MEMORY=1M-4M STEP=512K
ADDRESS=1M-16M STEP=256K
　WRITABLE=YES
　MEMTYPE=SYS

The example describes a memory expansion board that can contain from 1 to 4 Mbytes of extended RAM. The memory can be added in 512 kbyte increments, with the address of the memory lying between 1 Mbyte and 16 Mbyte, with the starting address being any 256 kbyte boundary within this For a more complex example, assume ACME Manufacturing has a network board that contains onboard memory. The network board contains 64 kbytes of RAM. The board needs this memory to begin in the 1-2 Mbyte range. This memory will be writable, because it is RAM; but it would not be cacheable, because it is assumed to be the board's local memory. There are also two 2 kbyte ROM's on the board, each of which can be accessed at 0C0000h, 0D0000h or 0E0000h. The ROM's would not be writable but would be cacheable. The following example shows the portion of the CFG file that describes the memory, beginning with the RAM, followed by the ROM's. There are three MEMORY statements to describe the ACME Manufacturing network board memory.

;NETWORK BOARD RAM
MEMORY=64K
ADDRESS=1M-2M STEP=64K
　WRITABLE=YES
　SIZE=BYTE
　MEMTYPE=SYS
　CACHE=NO
;NETWORK BOARD ROM1
MEMORY=2K
ADDRESS=0C0000h|0D0000h|0E0000h
　WRITABLE=NO
　MEMTYPE=SYS
　SIZE=BYTE
　CACHE=YES
;NETWORK BOARD ROM2
MEMORY=2K
ADDRESS=0C0000h|0D0000h|0E0000h
　WRITABLE=NO
　MEMTYPE=SYS
　SIZE=BYTE
　CACHE=YES

The lines beginning with semicolons are comment lines and can be inserted for easier interpretation of the configuration information.

As the FUNCTION statement has the SUBFUNCTION statement, the CHOICE statement also has the SUBCHOICE statement. The general syntax follows.

CHOICE="name"
  global Resource Description Block
  [SUBCHOICE]
    [subchoice Resource Description Block]
  [SUBCHOICE]
    [subchoice Resource Description Block]

A CHOICE statement may have as many subchoices as desired, but only one SUBCHOICE statement per CHOICE statement is utilized. Each SUBCHOICE statement contains the Resource and INIT statements relating to the SUBCHOICE, while the global Resource Description Block contains the Resource and INIT statements which are used regardless of the SUBCHOICE used. Subchoices are used to allow the configuration means to select from the available choices, rather than have the integrator select from a long, often confusing, list of configuration choices as, for example, in a memory expansion board having capabilities of performing in conventional, extended or expanded modes. For further example, if the integrator did not wish to make a choice between the actual locations of a serial port, such as COM1 or COM2, a CHOICE statement would be developed for the serial port and SUBCHOICE statements for COM1 and COM2 would be used. However the integrator would not know which COM port had been selected so that in this case the use of subchoices is not recommended.

A better example is use with a memory board. Assume that a memory board is being configured and the allocation of memory on the board between base system memory and extended memory is dependent on the amount of memory that currently exists in the system. This could be accomplished by four CHOICE statements as follows:

CHOICE="Memory located after 256K"
  CHOICE="Memory located after 384K"
  CHOICE="Memory located after 512K"
  CHOICE="Memory located after 640K"

or a single CHOICE statement as follows and four SUBCHOICE statements:

CHOICE="Memory located after existing base memory"

If the system already had 512 Kbytes of base memory installed, the configuration means would automatically select the third SUBCHOICE in the subchoice example but would have an unresolvable conflict in the CHOICE only case until the first two CHOICES were disabled, generally manually by the integrator. Thus the use of SUBCHOICES simplifies operation for the integrator.

For particular use with the SUBCHOICE statements in memory board CHOICE statements is the TOTALMEM statement whose general syntax is as follows:

TOTALMEM=rangelist [STEP=value]

The TOTALMEM statement is used to identify the total memory located on the board, particularly valuable when the memory can be allocated between conventional, extended or expanded types. This allows the configuration means to verify that the total amount of memory selected does not exceed the maximum installed. The TOTALMEM statement must be used with any CHOICE statement that allows the memory to be divided between conventional, extended and expanded, preferably placed before any Resource or INIT statements. The memory amount referenced includes only SYS and EXP memory types but not OTHER memory.

INIT statements provide the values needed to initialize programmable boards or the jumper or switch settings used on non-programmable boards. The INIT statements for programmable boards concern I/O addresses and the values that should be written to those locations to set up a given configuration choice. The example below shows the first general format of the INIT statement for I/O addresses which would be used for programmable boards.

INIT=IOPORT(i) list

The IOPORT(i) field refers to the I/O address or port previously defined in the Initialization Information Block. The INIT statement contains the list of values to be written to that I/O address or port. The values are in a binary form with a bit mask. For example, assume the following INIT and DMA statements are related, and that bit 3 of the port defined by the IOPORT(i) statement in the Initialization Information Block must be set to enable DMA channel 3 and cleared to enable DMA channel 4:

LINK
    DMA=3|4
    INIT=IOPORT(1) xxxx1xxx|xxxx0xxx

The x's refer generally to bits which are not changed from their existing condition.

A second general format is provided for boards which must have a large number of IOPORT statements and the associated INIT statement linkage would get cumbersome. A direct addressing form is provided so that a corresponding IOPORT statement is not needed. The general syntax is as follows:

INIT=IOPORT (address) list where the address parameter is the address of the desired single I/O port and the list is as in the first general format. As an example, assume the IOPORT(1) statement of the previous example referenced the port at 0Z380h. The example is then:

LINK
    DMA=3|4
    INIT=IOPORT (0Z380h) xxxx1xxx|xxxx0xxx

The INIT statements for switch programmable and jumper programmable boards are similar and include a switch/jumper identification block. The following figure shows the general syntax of the optional INIT statement for switch and jumper programmable boards.

INIT=SWITCH(i) LOC(switchlist) list
  INIT=JUMPER(i) LOC(jumperlist) list

The SWITCH(i) or JUMPER(i) field indicates which switch or jumper group is being initialized. The LOC parameter indicates which switches within the set or which jumpers are being described. The list field describes the way the switches or jumpers should be set. A 1 indicates that a switch is in the ON position, a 0 indicates the switch is in the OFF position and an X indicates a don't care condition. Jumper settings are as previously described based on the type of the jumper. An example of a switch initialization of a PORT is shown below.

LINK
    PORT=300h-30Fh STEP=4
    INIT=SWITCH(1) LOC(1 2) 00|01|10|11

The PORT statement has four possible configurations and switches 1 and 2 of SWITCH(1) are used to set the configurations, as shown in the following table.

| Port Range | SW. 1 | SW. 2 |
|---|---|---|
| 300h-303h | OFF | OFF |

-continued

| Port Range | SW. 1 | SW. 2 |
|---|---|---|
| 304h-307h | OFF | ON |
| 308h-30Bh | ON | OFF |
| 30Ch-30Fh | ON | ON |

An INIT statement also exists to relate a SOFTWARE statement. The general syntax is:
    INIT=SOFTWARE (i) list
where SOFTWARE (i) defines the previously defined SOFTWARE statement and list is a text list of parameters passed to the SOFTWARE statement for display. This allows the user to be informed of the necessary settings for use in the CONFIG.SYS or AUTOEXEC.BAT files. An example follows:
    SOFTWARE(1)="The Network Adapter is initialized using the program n NET.EXE. The following command should be placed n your AUTOEXEC.BAT file: NET /I=X /D=y where"
    LINK
        IRQ=3|4|5
        INIT=SWITCH(1)LOC(1 2) 00 01 10
        INIT=SOFTWARE(1) "x is 3" | "x is 4" | "x is 5"

LINK
        DMA=2|5
        INIT=SWITCH(1)LOC(3) 0|1
        INIT=SOFTWARE(1) "y is 2" | "y is 5"

If the configuration means determines that the board is to be at interrupt line 3 and DMA channel 2, the following display is presented.

The Network Adapter is initialized using the program NET.EXE. The following command should be placed in your AUTOEXEC.BAT file: NET /I=x /D=y where
    x is 3
    y is 2

As previously mentioned, Resource Statements and INIT statements are related into groups within each CHOICE. The groups can be LINKed, COMBINEd or FREE form. A linked group is for Resource statements which switch together when a setting is changed. A combined group is used when the INIT statement encompasses all combinations of the resource statements in the group. In a free form group the Resource and INIT statements are completely unrelated. Grouping information must be provided for Resource and INIT statements. Default conditions of linking INIT statements to the previous Resource Statement or having everything free form are possible, but are not considered preferable because of resulting complexities in the configuration means.

In a linked group each statement, Resource and INIT, must have the same number of options specified in the list. The options are then treated as having a one-to-one correspondence with the same option number in the other linked statements. The general syntax is as follows:
    LINK
        Resource statements
        INIT statements
An example is as follows:
    LINK
        IRQ=3|4
        DMA=2|5
        INIT=IOPORT(1)xxxxxx10|xxxxxx01
In this example, choosing the first initialization value of xxxxxx10 results in IRQ line 3 and DMA channel 2 being used, while DMA channel 5 and IRQ line 4 are used in the second case.

In a combined group values for every combination of options legally possible from all the resource statements are provided for in the INIT statements. This group type is used primarily for memory functions with the MEMORY and ADDRESS statements. The general syntax and an example follow:
    COMBINE
        Resource Statements
        INIT Statements
    COMBINE
        MEMORY=1M|2M
        ADDRESS=1M|2M
        INIT=IOPORT(2)
            00xxxxxx|01xxxxxx|10xxxxxx|11xxxxxx In the example, the first value in the INIT statement list is used to configure for 1 Mbyte of memory starting at an address of 1 Mbyte. The second INIT value is used for 1 Mbyte of memory starting at address 2 Mbyte, with the third and fourth INIT values representing the values for 2 Mbytes of memory starting at 1 Mbyte and 2 Mbytes of memory starting at 2 Mbyte. Thus the first value of the first Resource Statement is used until all following Resource Statement values have been used, and then the second value of the first Resource Statement is used, and so on until all the combinations have been tried.

A more complex example and the resulting memory amount, start address and value table are shown below:
    COMBINE
        MEMORY=1M|2M
        ADDRESS=1M 4M STEP=1M
        INIT=IOPORT(1)xxxxx000-xxxxx100

| Memory Amount | Starting Address | Port Value |
|---|---|---|
| 1M | 1M | xxxxx000 |
| 1M | 2M | xxxxx001 |
| 1M | 3M | xxxxx010 |
| 2M | 1M | xxxxx011 |
| 2M | 2M | xxxxx100 |
| 2M | 3M | — |

As can be seen only legal combinations have associated port values. Starting addresses cannot be at 4 Mbyte because of the range specification in the Address Statement. A starting address of 3 Mbyte for 2 Mbytes of memory is not valid because then the address range would exceed the allowed 4 Mbyte upper limit. So only five legal combinations are present and the five INIT values are sufficient.

The final type of grouping is free form, with the following general syntax and an example.
    FREE
        Resource Statements
        INIT Statements
    FREE
        IRQ=2|3|4
        DMA=4
        INIT=IOPORT(2) xxxx1010

In the above example the interrupt line can be 2, 3 and 4 and no initialization information is needed by the configuration means. In this case selection of the appropriate interrupt line is assumed to be done by an independent program. Also in the example, only DMA channel 4 can be used and the initialization value indicated in the INIT statement is always performed. Thus each Resource and INIT statement is independent of the others and no linkage is required.

The following is an example showing several of the advanced features previously discussed.

```
IOPORT(1)=0Z280h
   INITVAL=11100XX
IOPORT(2)=PORTVAR(1) ;Variable port
   INITVAL=XXXX10xx
FUNCTION="Serial Port"
   SUBFUNCTION="PORT NUMBER"
      CHOICE="COM1"
         PORTVAR(1)=3F9h
         LINK
            PORT=3F0h-3FFh
            INIT=IOPORT(1) XXXXXX01
      CHOICE="COM2"
         PORTVAR(2)=2F9h
         LINK
            PORT=2F0h-2FFh
            INIT=IOPORT(1) XXXXXX10
   SUBFUNCTION="Baud Rate"
      CHOICE="1200"
         FREE
            INIT=IOPORT(2) 1001XX00
      CHOICE="2400"
         FREE
            INIT=IOPORT(2) 1001XX01
```

In the above example, the I/O port used to initialize the baud rate is dependent upon whether the serial port is selected as COM1 or COM2. The use of SUBFUNCTIONs allows the serial port to be simply configured and the use of the PORTVAR(j) feature allows a simpler reference for dependent values.

In the preferred embodiment, the system board manufacturer provides a means for storing the configuration information, such as battery powered CMOS RAM, to provide the initialization sequence a location to uniformly retrieve the programmable configuration information which is then written to the boards.

Turning now to the means and method for determining the configuration files and configuring the boards and system, the invention is arranged so that the user can configure the user's computer system and circuit boards by using either the user's own system, in whole or in part, before any optional circuit boards are installed, or the configuration information may be determined on another computer and quickly installed into the user's system. The second arrangement provides for the vendor or a central office to efficiently configure a multiplicity of other systems.

In the preferred embodiment of the present invention, a computer program, interacting with person performing the configuration, referred to as the system integrator, determines a configuration file for each board to be inserted. As described above, the configuration file contains the one or more designated patterns for access to common computer system resources from which one pattern must be selected to accommodate each circuit board to be inserted in the system, as well as circuit board I/O address and initialization values. In the preferred embodiment, the program automatically selects a pattern for each circuit board so that the user's utilization of circuit boards in the system is maximized according to the user's specification. It is anticipated that the user's favored specification is to accommodate all boards if possible. This maximization is performed by resolving any conflicts for use of resources among circuit boards by determining the appropriate settings for each circuit board to remove any conflicts. The program then the stores configuration information based on the selected patterns and values for use in running the user's computer system. The storage may be in the system's non-volatile memory if the user is configuring the user's own system. The storage alternately, or in addition, may be in a system definition information file to be later transferred to the system's non-volatile memory.

In the preferred embodiment of the present invention one computer program performs the three functions of determining the available options and settings, selecting a satisfactory set of options and setting and storing the resulting configuration information.

In its preferred embodiment, the resource determination and conflict resolution process of present invention may be used in a simplified interactive utility module or in a fully functional utility module. A user may have both utility modules available and may use either as required. The resource conflict resolution process is identical in both the simplified utility and the fully functional utility. The simplified utility does not allow the flexibility of the full utility but is generally used if the proper configuration files are available.

Figure 8:
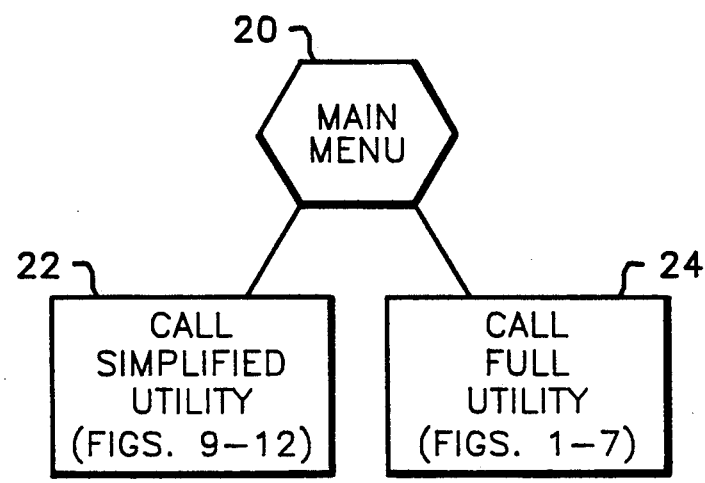
FIG. 8 is a flowchart of the main menu which calls either of two utility versions.
Figure 9A:
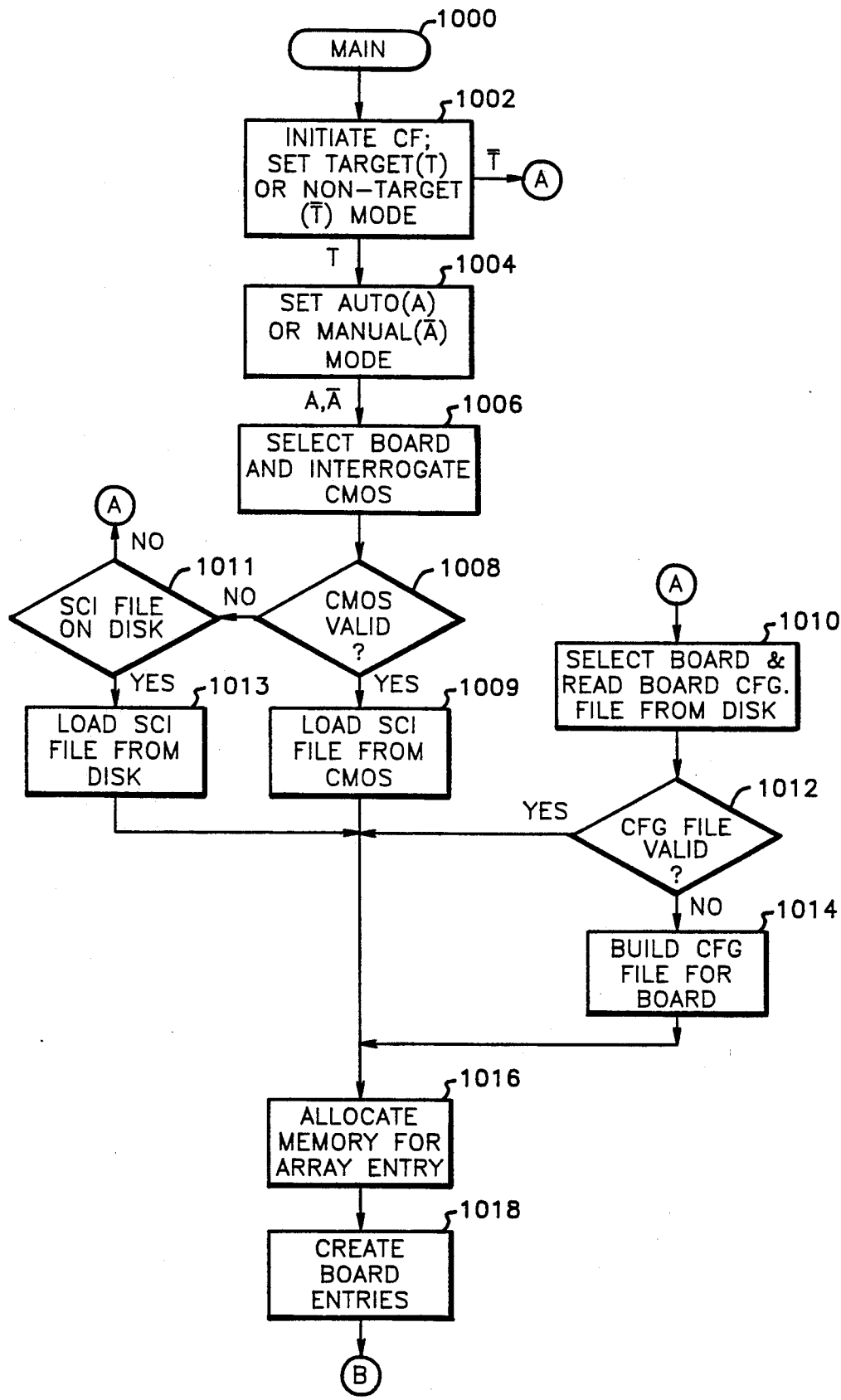
FIGS. 9A, 9B, 10A, 10B, 11 and 12 are flowchart illustrations of the simplified version of the utility including the method and apparatus of the resource allocation and conflict resolution abilities present invention.

The system integrator may use the simplified utility, the fully functional utility or both. It is envisioned that an end user will use the simplified utility whereas an advanced user or experienced system integrator will use the fully functional utility. FIG. 8 shows a master menu 20 which permits a user to choose either the simplified utility or the fully functional version. The simplified utility, including the conflict resolution routine, is called in step 22 after selection by the user, with control proceeding to a MAIN program 1000 (FIG. 9A). Operation of the simplified utility is described in FIGS. 9-12. The fully functional utility is described in FIGS. 1-7 and is called in step 24, with control proceeding to step 80 (FIG. 1A) or step 98 (FIG. 1) as appropriate. In both instances, the utilities may be run in a target or non-target mode. When in target mode, the utilities will attempt to configure the system on which the utilities are running. In non-target mode, the utilities are in a simulation mode.

The MAIN program 1000 of the conflict resolution utility allocates computer memory for an array to be used to store resource requests. In the case of an existing targeted system, the MAIN program 1000 will attempt to retrieve the SCI file from CMOS memory. If the SCI file is not in CMOS memory, the MAIN program 1000 will attempt to retrieve the SCI file from disk. The SCI file contains configuration information for the computer system and all boards currently installed in the system. If no SCI file is available, the MAIN program 1000 will read individual configuration files from disk for the computer system board and circuit boards to be added. The MAIN program 1000 then reads the individual CFG files.

An entry is created in the array for each SUBFUNCTION, CHOICE, LINK group and for each RESOURCE statement contained in the combined or free group. The entry for each configuration file statement is comprised of the configuration file statement itself and four fields which will be described below. Entries are not created for deactivated boards. A PROCESS subroutine 1100 operates generally as follows, with a flow chart described after the general description. An entry comprises one element that can be manipulated by the configuration routine to achieve a final configuration.

The SUBFUNCTION, CHOICE, LINK or RESOURCE statement comprises one part of an entry in the array. Four additional fields are added to each of the entries: entry status, entry type, parent status and grandparent status. These additional fields contain additional information related to the allocation process not contained in the SUBFUNCTION, CHOICE, LINK, or RESOURCE statement portion of an entry. In the following discussion, it is understood that a FUNCTION statement without an intervening SUBFUNCTION statement is processed as a SUBFUNCTION statement.

The entry status field has five possible values: ACTUAL, LOCKED, USER, CMOS and FREE. Each of these values includes additional information relating to the SUBFUNCTION, CHOICE, LINK or RESOURCE statement part of the entry and are assigned by the MAIN module. The ACTUAL statement is used to reflect a physical reality or limitation of the circuit board such as TOTALMEM, the total amount of memory available on the board. Only SUBFUNCTIONS may be assigned an ACTUAL entry status value. The ACTUAL statement is accorded the highest priority of entry status values. The next lower priority entry status value is LOCKED which is used to reflect that the particular values associated with the SUBFUNCTION, CHOICE, LINK or RESOURCE statement have been selected by the user and computer system is to retain those values, effectively "locking" the values. The next lower priority entry status value is USER which also reflects that the user has selected the values associated with the SUBROUTINE, CHOICE, LINK or RESOURCE statement. However, unlike a LOCKED value, a USER value will permit a LOCKED or ACTUAL value to override the user's selection during the conflict resolution process. The next lower priority entry status value is CMOS which indicates that the values associated with the SUBFUNCTION, CHOICE, LINK or RESOURCE statement originated from an SCI file previously stored in the computer systems' CMOS memory. The FREE entry status value is the lowest priority entry status value and is used to indicate that the SUBFUNCTION, CHOICE, LINK or RESOURCE statement was not selected as indicated in any of the prior entry status values.

The next field added to the SUBFUNCTION, CHOICE, LINK or RESOURCE statement to make up the entry is the entry type. The values are SUBFUNCTION, CHOICE, LINK and RESOURCE, in descending priority order. The values are assigned by the MAIN program 1000 and correspond to the type of configuration file statement part of the entry. Thus, a SUBFUNCTION statement is assigned a SUBFUNCTION entry type, a CHOICE statement is assigned a CHOICE entry type, and so forth.

The next two fields added by the MAIN program 1000 are parent and grandparent status. Parent status is used to reflect the entry status and entry type of the statement which calls the present SUBFUNCTION, CHOICE, LINK or RESOURCE statement. Likewise, the grandparent status reflects the entry status and type of the parent statement's parent. The parent and grandparent status values may consist of any valid combination of SUBFUNCTION, CHOICE, LINK or RESOURCE entry type values and ACTUAL, LOCKED, USER, CMOS or FREE entry status values. As explained above, only SUBFUNCTIONs may be assigned an ACTUAL value. A SUBFUNCTION entry type will have no parent or grandparent status and will be assigned a null value for the parent and grandparent status fields. A CHOICE entry type will have no grandparent status and will be assigned a null value for the grandparent status field. A list of valid entry status, entry type, parent status and grandparent status values follows:

| entry status | entry type | parent status | grandparent status |
| --- | --- | --- | --- |
| sf - actual | subfunction | null | null |
| sf - locked | subfunction | null | null |
| ch - locked | choice | sf - actual | null |
| ch - locked | choice | sf - locked | null |
| rg - locked | resource | ch - locked | sf - actual |
| rg - locked | resource | ch - locked | sf - locked |
| sf - user | subfunction | null | null |
| ch - user | choice | sf - actual | null |
| ch - user | choice | sf - locked | null |
| ch - user | choice | sf - user | null |
| rg - user | resource | ch - locked | sf - actual |
| rg - user | resource | ch - locked | sf - locked |
| rg - user | resource | ch - user | sf - actual |
| rg - user | resource | ch - user | sf - locked |
| sf - cmos | subfunction | null | null |
| ch - cmos | choice | sf - actual | null |
| ch - cmos | choice | sf - locked | null |
| ch - cmos | choice | sf - user | null |
| ch - cmos | choice | sf - cmos | null |
| rg - cmos | resource | ch - locked | sf - actual |
| rg - cmos | resource | ch - locked | sf - locked |
| rg - cmos | resource | ch - user | sf - actual |
| rg - cmos | resource | ch - user | sf - locked |
| rg - cmos | resource | ch - user | sf - user |
| rg - cmos | resource | ch - cmos | sf - actual |
| rg - cmos | resource | ch - cmos | sf - locked |
| rg - cmos | resource | ch - cmos | sf - user |
| rg - cmos | resource | ch - cmos | sf - cmos |
| sf - free | subfunction | null | null |
| ch - free | choice | sf - actual | null |
| ch - free | choice | sf - locked | null |
| ch - free | choice | sf - user | null |
| ch - free | choice | sf - cmos | null |
| ch - free | choice | sf - free | null |
| rg - free | resource | ch - locked | sf - actual |
| rg - free | resource | ch - locked | sf - locked |
| rg - free | resource | ch - user | sf - actual |
| rg - free | resource | ch - user | sf - locked |
| rg - free | resource | ch - user | sf - user |
| rg - free | resource | ch - cmos | sf - actual |
| rg - free | resource | ch - cmos | sf - locked |
| rg - free | resource | ch - cmos | sf - user |
| rg - free | resource | ch - cmos | sf - cmos |
| rg - free | resource | ch - free | sf - actual |
| rg - free | resource | ch - free | sf - locked |
| rg - free | resource | ch - free | sf - user |
| rg - free | resource | ch - free | sf - cmos |
| rg - free | resource | ch - free | sf - free |

The MAIN program 1000 constructs an entry in the array for each SUBFUNCTION, CHOICE, LINK or RESOURCE statement appearing in a configuration file for all boards to be added to the computer system, including entry status, entry type, parent status, grandparent status and the statement information. The array is then sorted from highest to lowest priority. The sort keys in order of priority are: entry status, entry type, parent status, grandparent status, slot number and input sequence. The above listing reflects only the first four sort keys. In addition, the MAIN program 1000 creates artificial BARRIER entries in the array. BARRIERs are placed between the following entry status levels: LOCKED and USER, USER and CMOS, CMOS and FREE. These barriers are initialized as active entries.

All entries in the array also carry an initialization field. BARRIER and SUBFUNCTION entries are always initialized as active. CHOICE, LINK and RESOURCE are marked as active only when they have been selected by a prior SUBFUNCTION, CHOICE or CHOICE, respectively.

Once the array has been sorted, the MAIN program 1000 calls the PROCESS subroutine 1100. The PROCESS subroutine 1100 uses entries as selectors. A SUBFUNCTION entry selects the CHOICE to be used by the SUBFUNCTION. A CHOICE entry selects the SUBCHOICE to be used by the CHOICE. A LINK entry selects the set of linked RESOURCE values which can be used by the RESOURCE statements in the group. A RESOURCE entry selects the initial resource value which can be used by the RESOURCE statement. As noted above, LINK and RESOURCE statements may provide for alternate resource values. In the preferred embodiment, the RESOURCE statement will preferably select the resource listed first as opposed to alternate resources, if any.

When an active LINK group or RESOURCE entry is encountered, the resource values that it references are allocated by the ALLOCATE subroutine 1200. If a resource allocation causes conflict with one or more previous allocations, the entrys are marked with a conflictor number.

A conflictor number is a flag which is set for the resource request which creates the conflict, known as the conflicting allocation, its parent and its grandparent. Further, a conflictor number is set for entry with which the current entry is in conflict, known as the prior allocation, its parent and its grandparent. The conflictor number is used to maintain the hierarchical relationships between entries which are parties to the conflict, either directly or through parent or grandparent relationship, and relative priorities between conflicting resource request.

Once a conflict has arisen, the ALLOCATE subroutine 1200 attempts to resolve the conflict by first determining whether the conflicting entry can be assigned alternate resources specified in the resource request. Prior to assigning alternate resources, the ALLOCATE subfunction first determines whether the conflicting and prior allocation may share the requested resources. If they may not share, ALLOCATE determines whether alternate resources may be specified. If sharing is permitted, ALLOCATE will determine if the prior and conflicting allocations have the same share text. If the same share text is present for both entries, the requested resources are allocated and shared. If the prior and conflicting allocations do not have the same share text and sharing is permitted, a share flag, indicating that sharing is available is set but not enabled. If alternate resources are specified, they are allocated to the conflicting entry. The ALLOCATE subroutine 1200 then determines if the assignment of the alternate resources creates a conflict. If a conflict arises from assignment of alternate resources to the entry, ALLOCATE will determine if a second set of resources has been specified by the entry. ALLOCATE will continue to assign alternate resources and test for conflicts until resolution of the conflict or until there exist no further alternatives. Thus, an entry's alternate resources are used by ALLOCATE before consideration of alternative means of conflict resolution.

Should the assignment of the entry's alternate resources fail to resolve the conflict or the entry have no alternate resources specified, the ALLOCATE subroutine calls the BACKTRACK subroutine 1300 and the array is traversed backwards to any previous entry with a stored conflictor number equal to or greater than the conflict number of the failed entry. This previous entry will either be the lowest priority conflicting entry or the parent of the failed entry. This is now the current entry. In this way, all intermediate entries not participating in the current conflict are skipped, thus avoiding any combination of resources that would be invalid due to the current conflict.

Upon reaching an entry which is a party to the current conflict, the BACKTRACK subroutine 1300 first attempts to "bump" the entry to an alternate resource. If an alternate resource is specified, the entry will be set to the alternate resource and control returned to the PROCESS subroutine stop 1202 which will attempt to allocate the alternate resources. If no alternate resources have been specified or all alternatives have been exhausted, the BACKTRACK subroutine 1300 will continue its backward processing until encountering another party to the conflict or a BARRIER. If it encounters another party to the conflict, subroutine BACKTRACK 1300 will attempt to bump to alternate resources. If a BARRIER is encountered, subroutine BACKTRACK 1300 determines whether a share flag has been set. If a share flag is set, even though the entry causing the share flag to be set is not a party to the conflict, the BACKTRACK subroutine 1300 enables sharing and forward processing resumes. If sharing and alternate resources do not resolve the conflict, the BACKTRACK subroutine will eventually again reach the BARRIER.

If the disable flag has been set, the BACKTRACK subroutine 1300 will enable disabling and forward processing resumes. If disabling, sharing and alternate resources do not resolve the conflict, the BACKTRACK subroutine 1300 will again reach the BARRIER. Upon determining that disabling, sharing and alternate resources did not resolve the conflict, the BARRIER is set to inactive and the BACKTRACK subroutine 1300 will backup to the next party to the conflict and attempt to resolve through alternate resources, sharing or disabling, in that order. If the conflict has not been resolved after considering alternate resources for the conflicting entry, sharing and disabling of resources, the BACKTRACK subroutine 1300 processes the array back to the top of the array and returns control of the system to the ALLOCATE subroutine 1200. The ALLOCATE 1200 subroutine then tests to determine if the current entry is at the top of the array. If at the top of the array, there is no feasible configuration for the boards specified. The ALLOCATE subroutine 1200 sets an error code and returns control of the system to the PROCESS subroutine 1100, which in turn returns control of the system to the MAIN program 1000. The MAIN program 1000 then displays an error message based upon the mode of operation.

It is possible for a RESOURCE entry to have a higher priority than a CHOICE or SUBFUNCTION entry due to a higher priority status. For example, a RESOURCE entry type having a LOCKED entry status has a higher priority than a CHOICE entry type having a CMOS entry status. By way of example, a RESOURCE entry type having a FREE entry status (RESOURCE-FREE) is found to be in conflict with a prior RESOURCE-LOCKED entry. Assuming that the RESOURCE-FREE has a CHOICE-FREE parent and a SUBFUNCTION-FREE grandparent, the RESOURCE-LOCKED entry will continue to have priority for the requested resources. If the RESOURCE-FREE entry has no alternative resource values, it will be preferable to change the resources allocated to its parent CHOICE-FREE entry. Therefore, the parents of an entry that fails to allocate are marked with that entry's number. When backing up the array, the entry's parent may be changed before the RESOURCE which caused the conflict.

When the end of the entry array is encountered by the PROCESS subroutine 1100, all active entries have been processed and a successful configuration has been achieved. If the beginning of the entry array is encountered while backing up, an unresolvable conflict exists and there is no possible successful configuration and ALLOCATE will set a failure code and either deactivate the last board added or note that a conflict exists.

The BACKTRACK subroutine 1300 also stops when it reaches a barrier entry. A BARRIER entry is a dummy entry placed on a border between two entry status levels. BARRIERs are placed between the following status levels: CMOS and FREE, USER and CMOS, and LOCKED and USER. BARRIERs are initialized as active entries.

In the present embodiment, the conflict resolution routine described above is used in both the simplified utility format and the fully functional format as generally described above. Further, the conflict resolution routine may be used in an automatic or manual mode. In the automatic mode the conflict resolution routine will attempt to allocate resources and resolve conflicts as each board is added to the computer system. If the routine is unable to resolve the conflict it will refuse to allocate the resources requested and mark the last board added to be deactivated. The conflict resolution routine may also be run in a non-automatic mode. In the non-automatic mode, the routine will indicate when a conflict exists, the conflicting circuit boards and the resource conflict. However, the routine will not attempt to resolve the conflict in the non-automatic mode. The system integrator may request the routine to resolve the conflict once it has been identified. The routine may be run in non-automatic mode in two manners. The routine may identify resource conflicts as each circuit board is added to the computer system. Alternatively, a user may add all the desired circuit boards, build entry array once and run the conflict identification routine on the entire array.

Resource sharing and disabling are not enabled during the ALLOCATE subroutine's 1200 first pass through the entry array. When the BACKTRACK subroutine 1300 first encounters an entry which is a party of the conflict, either directly or through parent or grandparent relationship, the BACKTRACK subroutine will attempt to assign alternate resources for that entry or "bump" the entry. If alternate resources are specified, the BACKTRACK subroutine will specify the alternate resources for the entry and return control of the utility to the PROCESS subroutine and forward processing resumes. The BACKTRACK subroutine 1300 will continue to bump the current entry until all alternates have been exhausted. If no alternates have been specified for the current entry or all alternates have been exhausted for the current entry, the BACKTRACK subroutine 1300 will continue process backwards in the array until the next party to the conflict or a BARRIER has been encountered. Then the next party to the conflict is encountered, the BACKTRACK subroutine 1300 will again attempt to resolve the conflict by allocating alternate resources. If the BACKTRACK subroutine will encounters a BARRIER, it first determines if the share flag has been set. It should be noted that the entry which initiated the setting of the share flag need not be a party to the conflict. If the share flag is set, the BACKTRACK subroutine 1300 will enable sharing and return control of the utility to the PROCESS subroutine 1100 and forward processing of the entry resumes. If the share flag is not set, the BACKTRACK subroutine will determine if the disable flag has been set. Again, the entry which initiated the setting of the disable flag need not be a party to the current conflict. If the disable flag has been set, the BACKTRACK subroutine 1300 will enable disabling and return control of the utility to the PROCESS subroutine 1100 and forward processing resumes. If neither the share or disable flag is set, the BACKTRACK subroutine will set the BARRIER status to inactive and continue searching backward for the next entry which is a party to the conflict. The BACKTRACK subroutine will attempt to resolve the conflict by assigning alternate resources for each party to the conflict by assigning alternate resources for each party to the conflict, enabling sharing and finally enabling disabling. If these measures fail to resolve the conflict, the BACKTRACK subroutine 1300 will continue to deactivate BARRIERs until it reaches the top of the entry array, at which time it will return to the ALLOCATE subroutine 1200 which will set a configuration failure code.

Figure 9B:
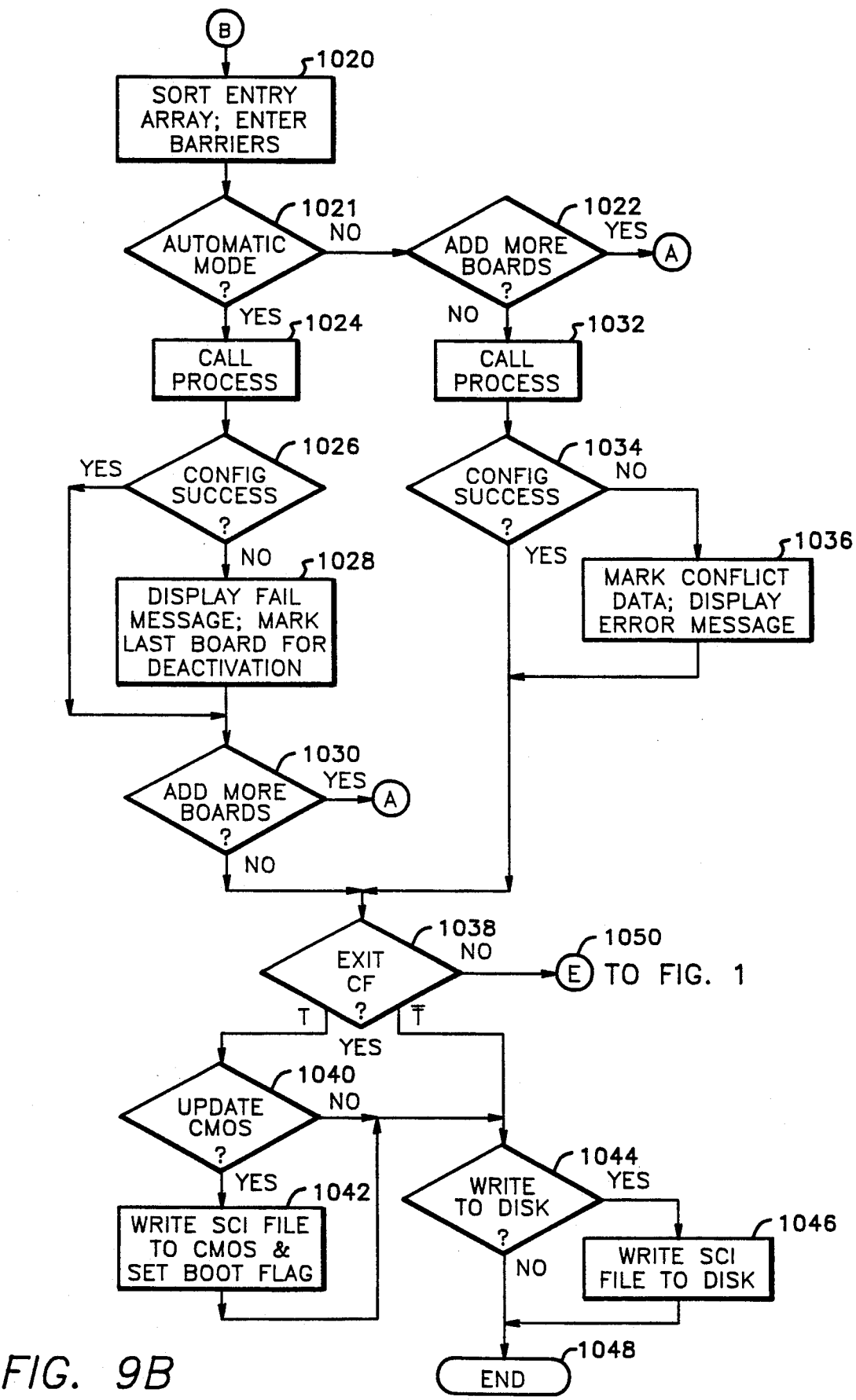

Referring now to FIGS. 9A and 9B which are flow charts of the simplified utility, including the preferred embodiment of the configuration routine, the MAIN program 1000 of the simplified utility begins at step 1002 where the user initiates the CF utility and the operational mode of the utility to target (T) or non-target ($\overline{T}$) mode based on whether a /N switch was present on the command line when the utility was requested. Where the utility has been set to target mode, control of the system is passed to step 1004 at which time the automatic (A) or manual ($\overline{A}$) mode is selected. Control is then passed to step 1006 wherein the user selects the board to be added to the present configuration.

It is contemplated under the present invention that the first board to be selected when configuring a system will be the system board. Step 1006 then interrogates the CMOS memory on the system board. Control is then passed on to step 1008 wherein it is determined whether the system board has valid CMOS which includes configuration or SCI information. If step 1008 determines that the CMOS is not valid or there is no CMOS, control is transferred to step 1011 which determines if the SCI file can be loaded from a disk or other mass storage device. If the SCI file can be loaded from a mass storage device, control is transferred to step 1013 which loads the SCI file from disk. Control is then transferred to step 1016. If the SCI file cannot be loaded from disk, control is transferred to step 1010. In step 1010, the utility copies the CFG file from a floppy disk onto the user's reference disk and reads the CFG file for the circuit board. CFG files may be created by the board manufacturer or by the system integrator. The CFG file information is loaded into the utility and control is then transferred to step 1012 wherein it is determined whether the CFG file is a valid file for the board selection. If the CFG file is not present or does not represent a valid file, control is then passed on to step 1014 wherein a valid CFG file is created for the board. The process carried out in step 1014 effectively transfers control of the system out of the simplified utility to step 400 of the fully functional utility in FIG. 4. Once the CFG file has been created for the board, control is then transferred to step 1016.

Should step 1008 determine that CMOS exists on the system board and at that the CMOS contains valid CFG SCI file information, control is transferred to step 1009. In step 1009 the utility loads SCI file information from CMOS. The SCI file information contains configuration information for circuit boards already in the computer system as well as the system board itself. In step 1016, the utility allocates memory for an array entry which corresponds to the selected board's CFG file information. Control is then transferred to step 1018 wherein the utility constructs the entry as previously explained and places it into the array. Control is then transferred to step 1020 (FIG. 9B) wherein the entry array is sorted by entry priority and BARRIERS are entered into the array between major priority levels. Control proceeds to step 1021 which determines if the system is in automatic or manual mode. If the system is in non-automatic (A) or manual mode, control is transferred from step 1021 to step 1022 wherein it is determined whether more boards are to be added to the array. If more boards are to be added to the array, control is transferred to step 1010. If the system is in automatic mode (A), control of the system is transferred from step 1021 to step 1024 wherein the PROCESS subroutine 1100 (FIG. 10A) is called. The PROCESS subroutine 1100 performs the conflict checking and resolution.

Control is returned from the PROCESS subroutine 1100 to step 1026 wherein it is determined whether the configuration was successful. If not successful, control is transferred to step 1028 which displays the failure message and marks the last board added for deactivation. If the configuration is successful, control is transferred to step 1030 wherein it is determined whether more boards are to be added to the current system. If more boards are to be added control is transferred to step 1010. If no more boards are to be added, control is transferred to step 1038.

In step 1022, if no further boards are to be added to the present system, control is transferred to step 1032 which calls the PROCESS subroutine 1100. The PROCESS subroutine 1100 returns control to step 1034 which determines whether the configuration was successful. If the configuration was not successful, control is transferred to step 1036 which marks the conflict data on the appropriate boards and displays the appropriate message. Control is transferred to step 1038. If step 1034 determines that the configuration was successful, control is transferred to step 1038.

At step 1038 the user has the option of leaving the configuration utility. If the user chooses to leave the configuration utility and the configuration program is in a target mode (T), control is transferred to step 1040 wherein the user has the option of updating the system CMOS. If the user chooses to update the system CMOS, control is transferred to step 1042, wherein the SCI file for the system is written to the system board CMOS and the boot flag is set. Control is transferred to step 1044. If the user chooses not to update the CMOS in step 1040 or the program is in non-target (T) mode in step 1038, control is transferred to step 1044, wherein the user has the option to write the SCI file to disk. If the user chooses to write the SCI file to disk, control is transferred to step 1046 wherein the SCI file is written to disk. Control is transferred to step 1048 which ends operation of the program and returns control to the operating system. If the user chooses not to write the SCI file to disk in step 1044, control is then directed to step 1048 which exits the utility. If the user chooses not to exit control is transferred to step 1050 which connects to FIG. 1E.

Figure 10A:
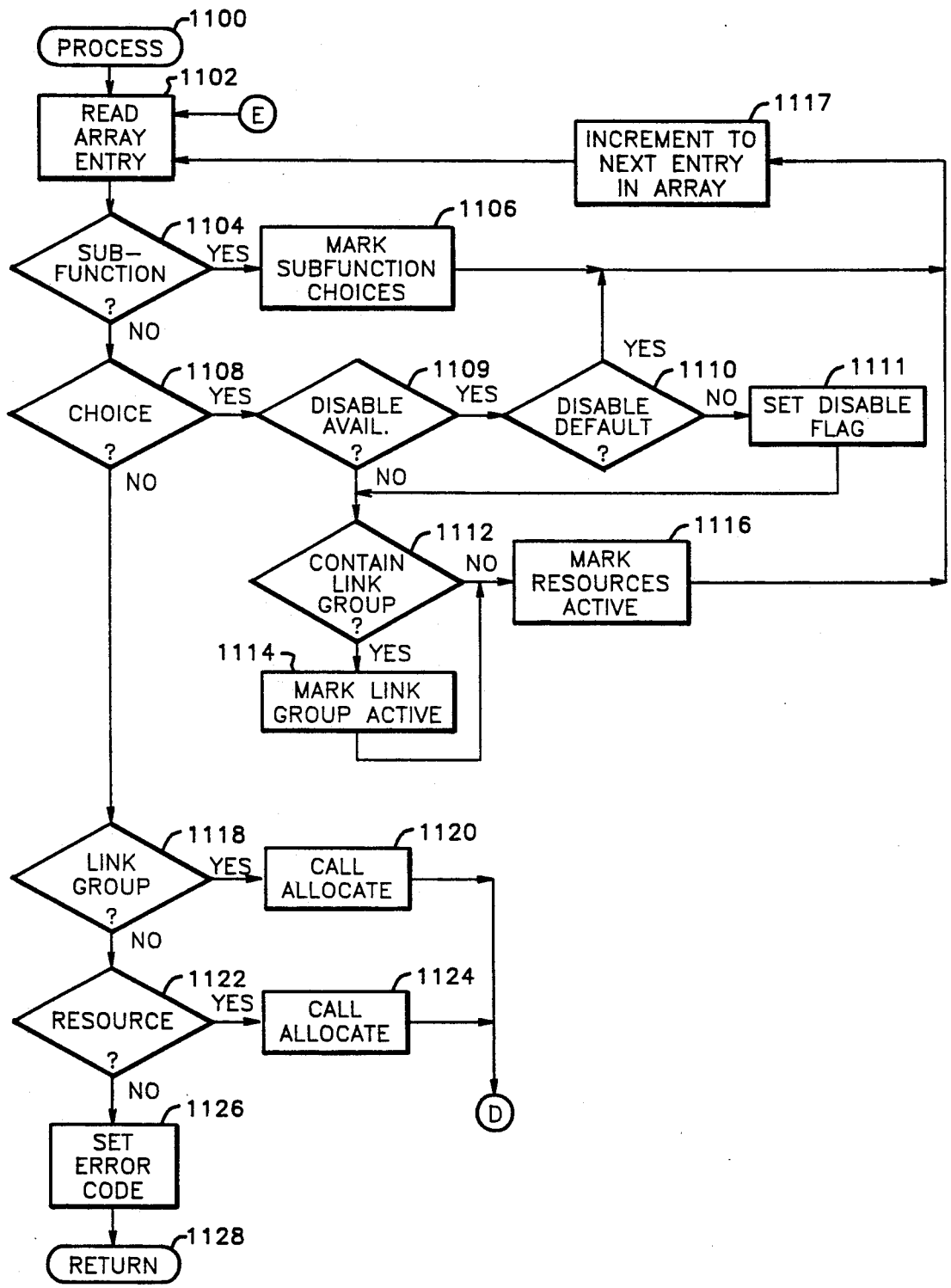
Figure 10B:
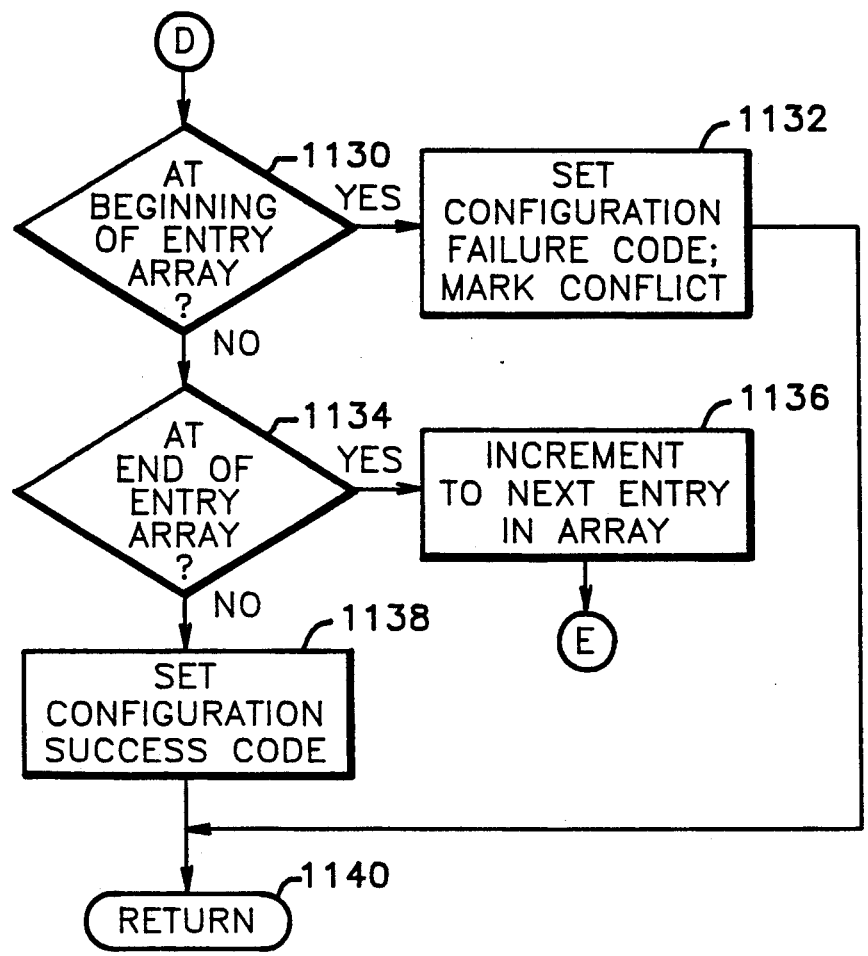

FIGS. 10A and 10B are flow charts of the conflict detection and resolution routine process, known as the PROCESS subroutine 1100. This routine is referred to in FIG. 6 at step 952 and in FIG. 9. The PROCESS subroutine 1100 starts operation at step 1102, where the system reads an entry in the array which was created in the MAIN program at step 1018. If the system is first entering into the PROCESS subroutine 1100, step 1102 will be reading the first array entry. Control is transferred on step 1104 which determines whether the entry is a SUBFUNCTION. If it is a SUBFUNCTION, control is transferred to step 1106 which marks the SUBFUNCTION CHOICES as active. Thereafter, control is transferred to step 1117 which increments to the next entry in the array. Control is then transferred to step 1102. If step 1104 determines that the entry is not a SUBFUNCTION, control is transferred to step 1108 which determines whether the entry is a CHOICE statement.

If the entry is a CHOICE statement, control is transferred to step 1109 which determines if disable is specified as a choice in the resource allocation block. If disable is specified, control is transferred to step 1110 which determines if disable is the default value for that choice. If step 1110 determines that disable is the default value no resources or link groups are activated and control is transferred to step 1117. If step 1110 determines that disable is not the default value, a "disable flag" is set which indicates that disabling was available but not selected for the entry. Control is then transferred to step 1112. If step 1109 determines that disabling was not specified as an option, control is transferred to step 1112. If the CHOICE is a part of the LINK group, control is transferred to step 1114 which marks the LINK group as active. Control is then transferred to step 1116. If the CHOICE is not part of a LINK group, control is transferred directly to step 1116 wherein the RESOURCES requested by the particular CHOICE are marked as active. Control is transferred to step 1117 which increments to the next entry in the array. Control is then transferred to step 1102.

Figure 11:
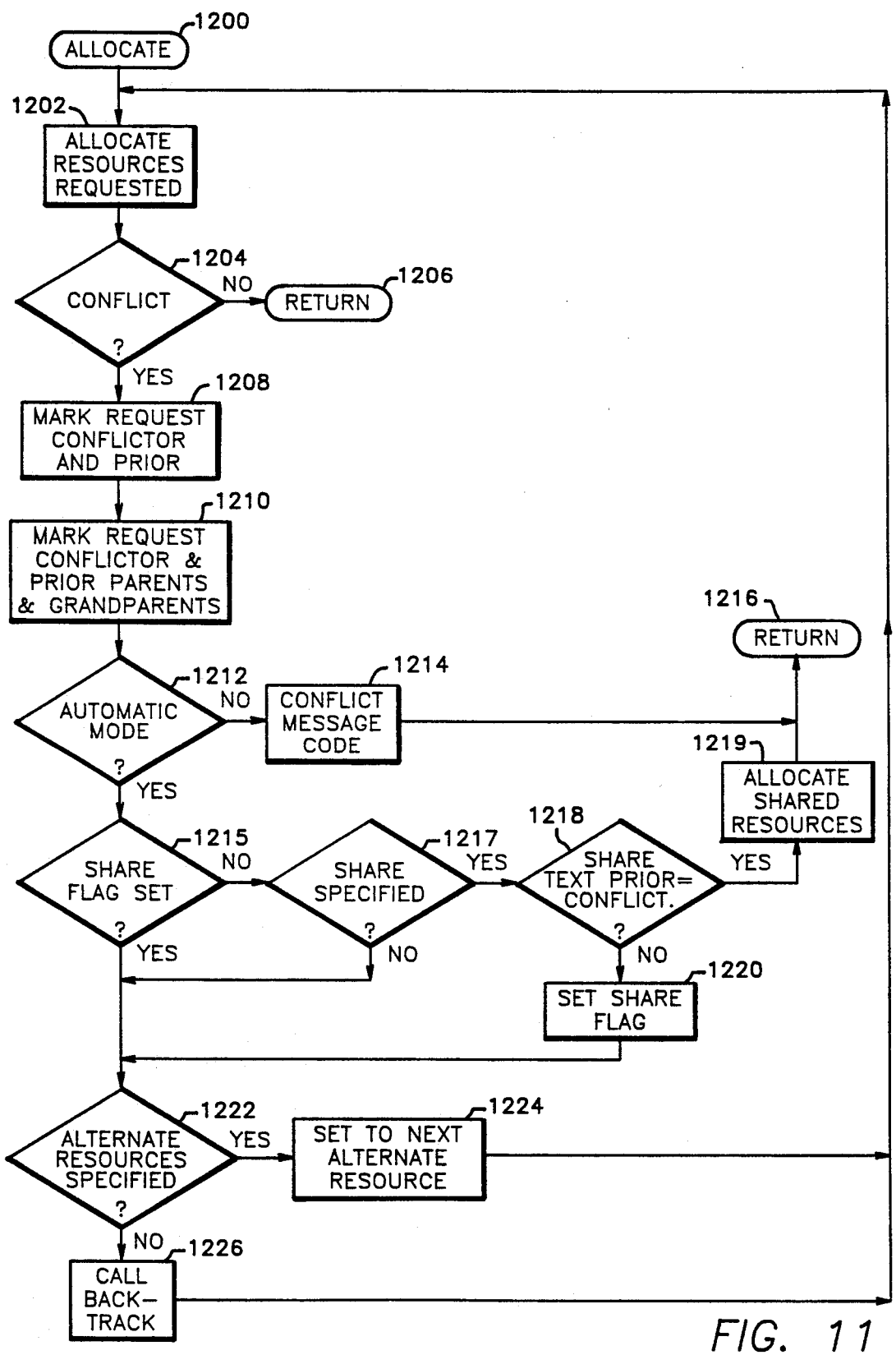

If step 1108 determines that the array entry is not a CHOICE, control is transferred to step 1118. In step 1118 the system determines whether the array entry is a LINK group which is already marked as active. If part of an active LINK group, control is transferred to step 1120 which calls an ALLOCATE subroutine 1200 (FIG. 11). The ALLOCATE subroutine reads the entry and attempts to allocate the resources requested by the RESOURCE entry. The ALLOCATE subroutine 1200 also determines if a conflict is created by attempting to allocate the resources requested by the RESOURCE entry. The ALLOCATE subroutine 1200 further makes an initial attempt to resolve any conflict by attempting to allocate alternate resources to the RESOURCE entry when alternates are specified. Upon return from the ALLOCATE subroutine 1200, control is transferred to step 1130 (FIG. 10B).

If the array entry is not part of a LINK group, control is transferred to step 1122, wherein it is determined whether the entry is a RESOURCE. If the entry is a RESOURCE, control is transferred to step 1124 which calls the ALLOCATE subroutine 1200 (FIG. 11). Upon return from the ALLOCATE subroutine 1200, control is then transferred to step 1130. If the array entry at step 1122 is determined not to be a RESOURCE, control is transferred to step 1126 which sets a configuration error code and control of the system is returned to the calling program in step 1128.

In step 1130, control is returned from the ALLOCATE subroutine which attempts to allocate the requested resources. If a conflict arises, the ALLOCATE subroutine 1200 (FIG. 11) will take initial steps to resolve the conflict by attempting to allocate alternate resources. Should this fail to resolve the conflict, the ALLOCATE subroutine 1200 will call the BACKTRACK subroutine 1300 (FIG. 12) which will process the entry array in reverse order in an attempt to resolve the conflict. The method of operation of the BACKTRACK subroutine 1300 will be explained further below.

Should the BACKTRACK subroutine 1300 fail to resolve the conflict, it will back up to the top of the entry array and return control to the ALLOCATE subroutine 1200 which will in turn return control of the system to step 1130. In step 1130 the subroutine 1100 determines if the BACKTRACK subroutine 1300 backed up the beginning of the entry array. If the entry is at the beginning of the entry array, control is transferred to step 1132 which sets a configuration failure code and marks the conflicts which resulted in the failure. Control is transferred to step 1140 which returns control to the calling program. If not at the beginning of the entry array, control is transferred from step 1130 to step 1134 which determines whether the current entry is at the end of the entry array indicating all entries have been reviewed. If not at the end of the entry array, control is passed on to step 1136 which increments to the next entry in the array and control is transferred to step 1102. If it is determined that the current entry is at the end of the entry array in step 1134, control is transferred to step 1138 which sets a configuration success code. Control is then transferred to step 1140 which returns control to the calling program.

FIG. 11 is a flow chart of the ALLOCATE subroutine 1200 which is called in steps 1120 and 1124 in FIG. 10A. The ALLOCATE subroutine 1200 starts operation at step 1202 which reads the entry which includes the entry status, entry type, parent and grandparent status for the entry as well as requested resource data, and allocates the resources requested by that particular entry in the array. At step 1204, the ALLOCATE subroutine 1200 determines determined whether a conflict exists between resources requested by the current entry and resources already allocated to prior entries. These resources would include DMA channels, I/O ports, memory and interrupt request lines. If no conflict is detected, control is transferred to step 1206 which returns to the calling program.

If a conflict is detected, step 1208 marks the current entry and the entry with which it is in conflict with a conflictor number. Control is transferred to step 1210 which marks the parents and grandparents for both the current entry and the conflicting entry. Control is transferred to step 1212 which determines whether the program is in non-automatic mode ($\overline{A}$). If in non-automatic mode ($\overline{A}$), control is transferred to step 1214 which flags the conflicting request with a error message code. In the non-automatic mode ($\overline{A}$), no attempt is made to resolve the conflicts. Rather, the non-automatic mode is designed to only point out where conflicts occur and no attempt is made to resolve such conflicts. Control is transferred to step 1216 which returns control of the system to the calling program. If the system is in automatic mode (A), control of the program is transferred to step 1215 which determines if the share flag is set. If the share flag is set, control is transferred to step 1222. If the share flag is not set, control is transferred to step 1217 which determines if sharing is specified for the conflicting and prior entries. If sharing is not specified, control is transferred to step 1222. If sharing is specified for the prior and conflicting entries, control is transferred to step 1218 which determines if the share option for the conflicting and prior allocations specify the same share text. If the same share text is specified, it is an indication that the resources are intended to be shared initially. If the same share text is specified in step 1218, control is transferred to step 1219 which allocates the requested resources in a shared mode. Control is then transferred to step 1216 which returns to the calling program. If the same share text is not specified in step 1218, control is transferred to step 1220 which sets a "share flag." This indicates that sharing was an option available but not selected for conflicting and prior entries. Control is then transferred to step 1222, which determines if alternate resources are specified for the current entry. If alternate entries are specified, control is transferred to step 1224 which sets the current entry to the next alternate resource. Control is then transferred to step 1202 which allocates the alternate resources. Control is transferred to step 1204 which determines if the assignment of alternate resources resolves the conflict. If the conflict is resolved by the assignment of alternate resources, control is transferred to step 1206 which returns control of the system to the calling program. If the conflict has not been resolved, control is transferred to step 1208 which again marks the conflicting entries with a conflictor number. Control is passed to step 1210 which again marks the conflicting entries' parent and grandparent entries. Control is transferred to step 1212 which determines if the system is in the automatic mode. If in the automatic mode (A), control is passed to step 1215. If not in the automatic mode (A), the system will have previously returned to the calling program via steps 1214 and 1216, during its first pass through the ALLOCATE subroutine. Since the share flag will have been already set in step 1220, step 1215 transfers control to step 1222. In step 1222, the ALLOCATE subroutine will determine if a second alternate set of resources has been specified. If additional alternate resources are specified, the ALLOCATE subroutine will transfer control to step 1202 and continue in this loop until either the conflict is resolved by allocation of alternate resources for the conflicting entry or until all alternate resource specified by the conflicting entry are exhausted. If no alternate resources are specified or all alternate resources are exhausted, control of the system is transferred to step 1226 which calls the BACKTRACK subroutine 1300 (FIG. 12).

The BACKTRACK subroutine 1300 attempts to resolve the conflict by enabling sharing of resources for the entries which are parties to the conflict, either directly or by parent or grandparent relationship. The BACKTRACK subroutine 1300 processes, in reverse order, all entries marked with the conflictor number in steps 1208 and 1210. The BACKTRACK subroutine 1300 processes the parties to the conflict in reverse order by priority, i.e., attempting to resolve the conflict by attempting to assign alternate resources to the next lowest priority entry which is a party to the conflict.

Control is then returned to step 1224 and forward processing resumes. If the assignment of alternate resources to the next lowest priority entry does not resolve the conflict, the conflict will again cause the ALLOCATE subroutine 1200 to call the BACKTRACK subroutine 1300. The BACKTRACK subroutine will process the array in reverse order until arriving at the entry to which alternate resources were assigned and determine if a different set of alternate resources may be assigned to the entry. If specified, the BACKTRACK subroutine sets the resource request to the second set of alternate resources and control is returned to the ALLOCATE subroutine 1200. The utility will continue to attempt to assign alternate sets of resources until all alternates are exhausted for the entry. When all alternate resources are exhausted for the entry or no alternate resources were specified for the entry, the BACKTRACK subroutine 1300 will continue to process the array backwards until the next party to the conflict or a BARRIER is encountered. This process is explained in greater detail below. Upon return from the BACKTRACK subroutine 1300, control is transferred to step 1202 which will attempt to allocate the alternate resources specified. Control is transferred to step 1204 which determines whether the actions taken by the BACKTRACK subroutine 1300 have resolved the conflict.

Figure 12:
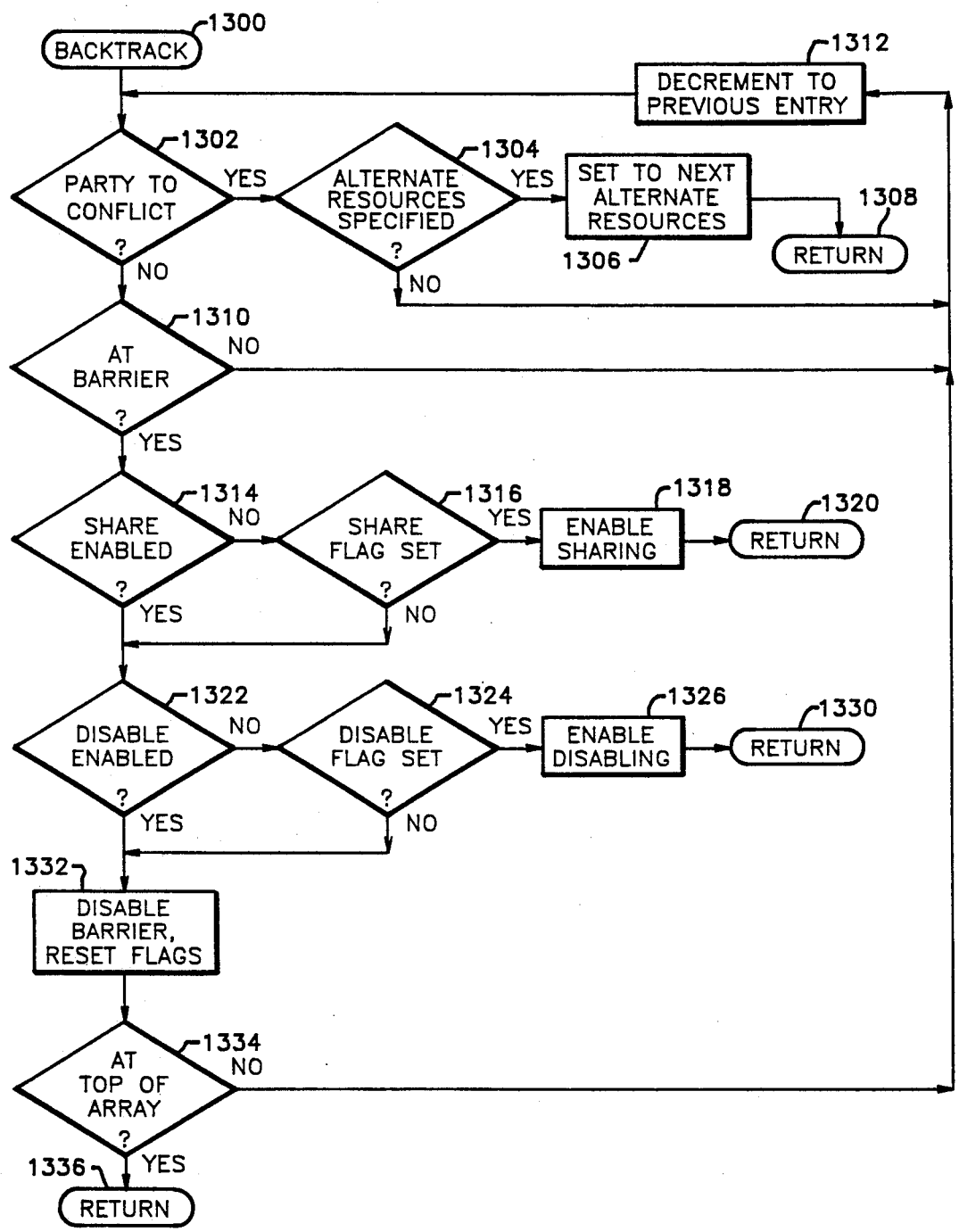

FIG. 12 is a flow chart of the BACKTRACK subroutine 1300 which is used to automatically resolve conflicts detected during the processing of the entry array. In step 1302, the BACKTRACK subroutine 1300 determines if the current entry has a conflictor number greater than or equal to the current entry, thus indicating the current entry to be a party to the conflict. Where the current entry is not a party to the conflict, control is transferred to step 1310 which determines if the current entry is a BARRIER. If the current entry is not a BARRIER, control is transferred to step 1312 which decrements to the previous entry in the array. Control is then transferred to step 1302. If step 1302 determines that the current entry is a party to the conflict, control is transferred to step 1304 which determines if alternate resources are specified for the current entry. In the present embodiment of the invention, a resource statement will always specify the first resource listed. In step 1304 it is determined whether other resources are specified for the current entry. If other resources are not specified for the current entry, control is transferred to step 1312 which decrements to the previous entry in the array. If alternate resources are specified for the current entry, control is transferred to 1306 which specifies the next set of alternate resources. Control is then transferred to step 1308 which returns to the controlling program. If step 1302 determines that the current entry is not a party to the conflict control is transferred to step 1310 which determines if the current entry is a BARRIER. If the current entry is not a BARRIER, control is transferred to step 1312 which decrements to the previous entry in the array. If the current entry is a BARRIER, control is transferred to step 1314 which determines whether sharing has been enabled. If sharing has not been enabled, control is transferred to step 1316 which determines whether the share flag has been set. If step 1316 determines that the share flag has been set, control is transferred to step 1318 which enables sharing. Control is then transferred to step 1320 which returns to the calling program and forward processing resumes. If step 1316 determines that the share flag has not been set, control is transferred to step 1322. If step 1314 determines that sharing has already been enabled, control is transferred to step 1322. In step 1322, the utility determines whether disable has been enabled. If disable has not been enabled, control is transferred to step 1324 which determines whether the disable flag has been set. If the disable flag has been set, control is transferred to step 1326 which enables disabling. Control is then transferred to step 1330 which returns to the calling program and forward processing resumes. If step 1324 determines that the disable flag has not been set, control is transferred to step 1332. If in step 1322 it is determined that a disable has already been enabled, control is transferred to step 1332. In step 1332, the current entry BARRIER is disabled and the share and disable flags reset. Control is transferred to step 1334 where it is determined whether the current entry is at the top of the array. If the current entry is not at the top of the array, control is transferred to step 1312. If the current entry is at the top of the array, control is transferred to step 1336 which returns to the allocate subroutine which will set a configuration error code.

Thus, the BACKTRACK subroutine 1300 will first attempt to allocate alternate resources to parties to the conflict in order to resolve the conflict. If this process fails, upon reaching a BARRIER, the BACKTRACK subroutine will determine if sharing of resources is available. If sharing of resources is available, sharing will be enabled and forward processing resumes. If the assignment of alternate resources and sharing of resources does not resolve the conflict, the BACKTRACK subroutine 1300 will determine if disabling of functions is available and attempt to resolve the conflict through disabling. If the assignment of alternate resources, the sharing of resources and the disabling of functions does not resolve the conflict, the BACKTRACK subroutine 1300 will disable the BARRIER. Thereafter, the BACKTRACK subroutine 1300 will attempt to find the next party to the conflict. If all parties to the conflict have been processed and the conflict persists, the BACKTRACK subroutine 1300 will continue to backup through the array, disabling BARRIERs until it reaches the top of the array.

The fully functional utility can be entered one of two ways, either to configure the computer system the utility is running on or to configure a different computer system. In the first case, the command CF originally entered by the user on the operating system command line is received at step 98 (FIG. 1). Control then proceeds to step 100 where the microprocessor reads the configuring system s own non-volatile memory, such as a battery powered CMOS RAM. If the system determines in step 102 that the data in the CMOS RAM is valid, indicating that the CMOS RAM has been previously configured and that the battery has not died, control proceeds to step 108. In step 108 the system accesses the various address locations where a board's identifier information would be stored if the board utilizes an addressing method that is slot specific and contains an identifier to determine what boards are present in which slots that utilize slot specific addressing. Additionally in step 108 the system reads the board configuration files that exist relating to the user's present system. Following this, control proceeds to step 110.

If the system in step 102 determines that the data in the CMOS RAM is not valid, for example because it has not been previously configured or the battery voltage has become too low, then control proceeds to step 104 where the system reads the system definition information file. In step 105 the system determines if the system definition information was valid. If not, for example because the file does not exist or has incorrect data, control proceeds to step 108. If the system definition information is valid, control proceeds to step 106, the system loads this information and uses it to provide default values for use in later options. Control then proceeds to step 108.

From step 108 control proceeds to step 110. In step 110, the system displays the known information about the installed boards and used slots. Control then proceeds to step 112 where a menu of options is presented. Depending upon the situation, the integrator selects between the options of viewing, creating/modifying, perform other options, configuring, obtaining help and exiting.

Figure 1A:
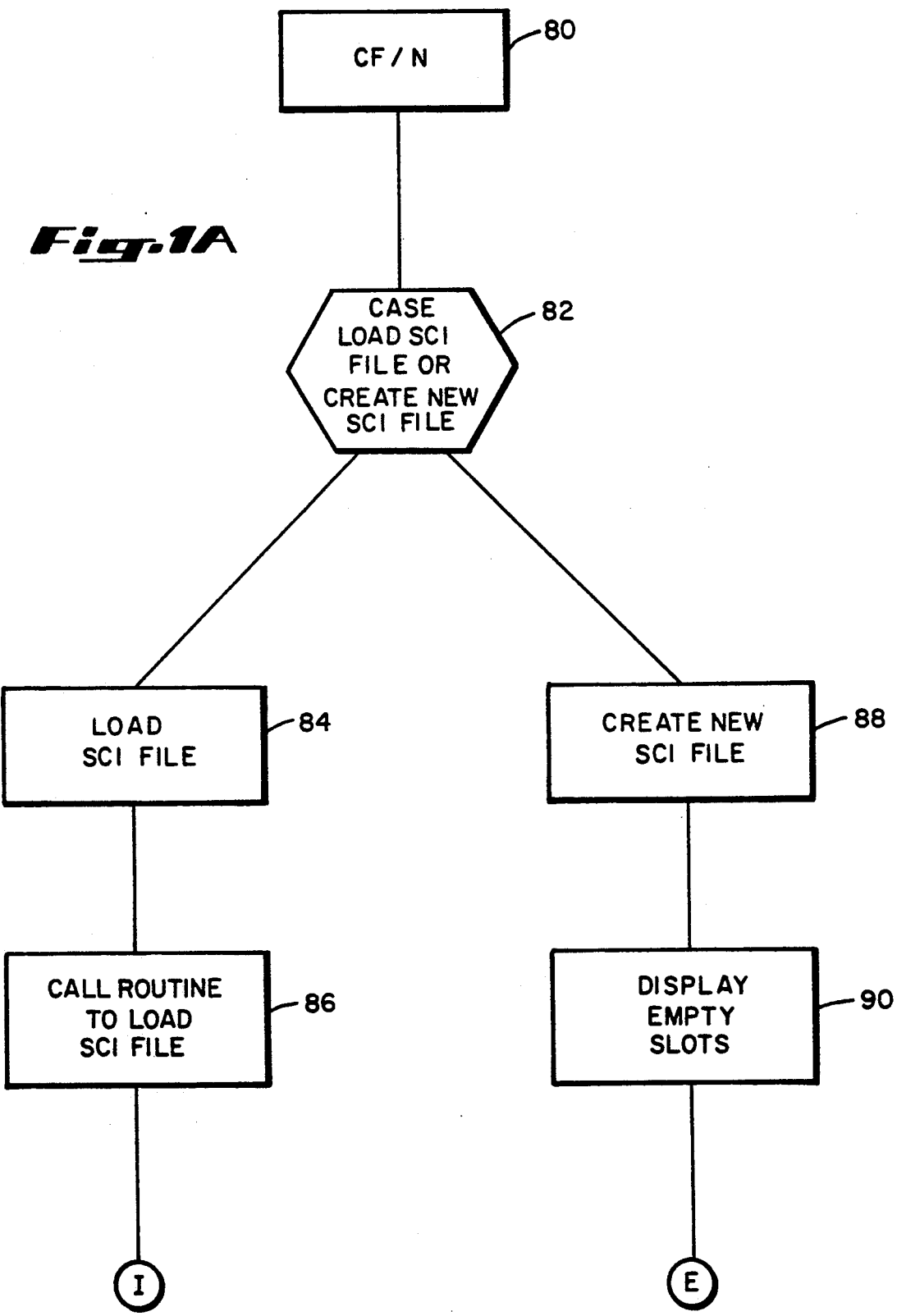
Figure 3B:
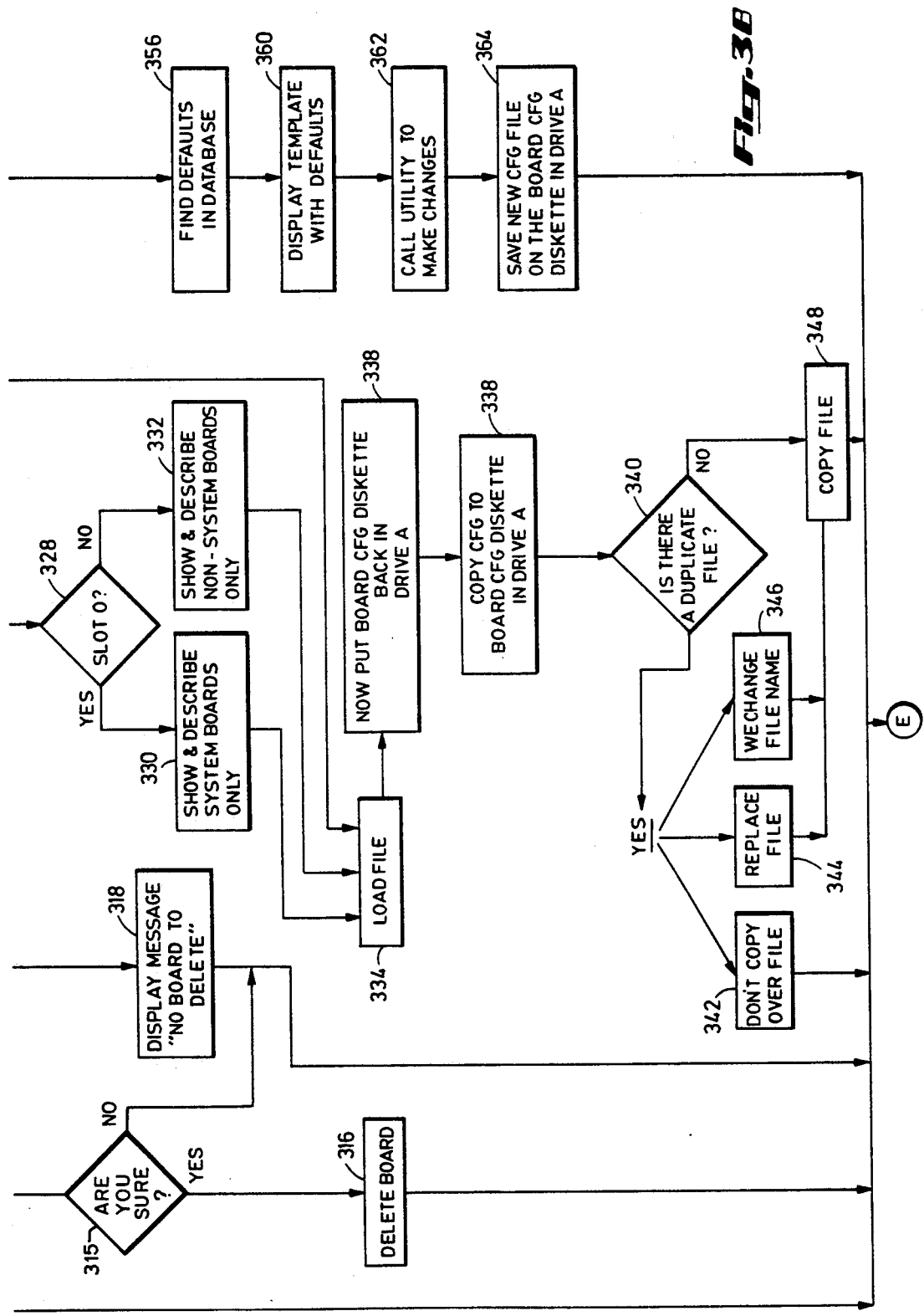
Figure 4:
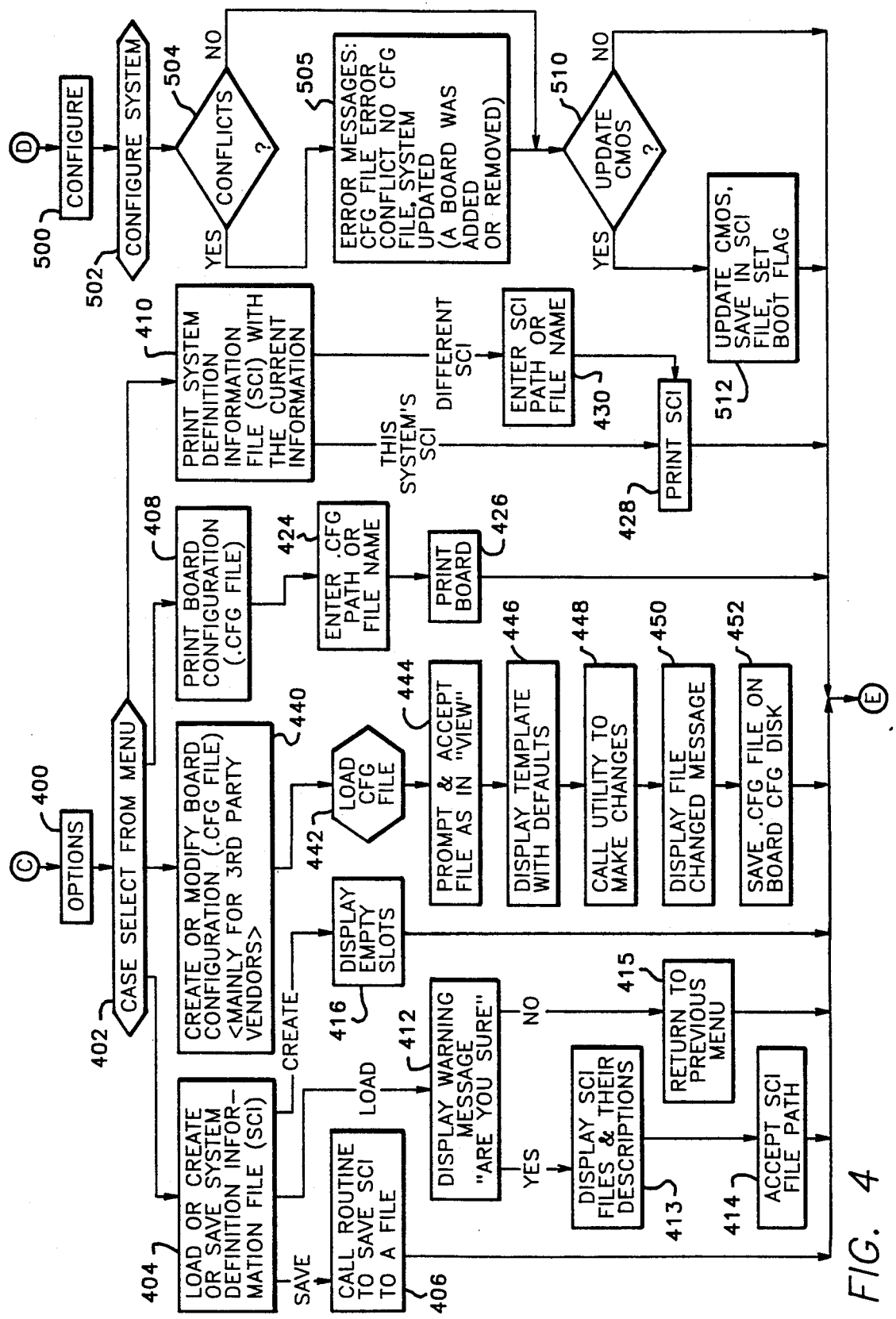

The alternate path for starting the fully functional utility is to enter the command CF /N on the command line, the /N being a switch to indicate that the configuration is not being done for the computer system running the program. The command is interpreted at step 80 (FIG. 1A). Control proceeds to step 82 where an option menu is presented to allow the integrator to select whether an existing or system definition information (SCI) file is to be loaded or a new SCI file is to be created. If the selected option is loading a file, control proceeds to step 84 and to step 86, where the SCI file is loaded by a separate routine which determines from the integrator the desired path for the file, at which time the file is loaded. Control then proceeds to step 110.

If a new SCI file is being created, control proceeds to step 88 to commence operation and then to step 90, where the system displays an empty slots configuration, unlike step 110, which displays the information on the installed boards, used slots and remaining empty slots. Control proceeds from step 90 to step 112.

The preferred embodiment of the present invention provides the integrator, the option of reviewing, using a display, the configuration files for boards that are associated with certain slots in the system definition information file. The integrator selects the view option and control proceeds to step 200 (FIG. 2) where the view option commences. The integrator then in step 202 selects a slot whose information is to be viewed. If the system definition information file determines that the selected slot is empty, as determined by the system in step 204, an appropriate message is displayed in step 206 and control returns to step 112. On the the other hand, if the existing system definition information file indicates that that slot has been assigned a board, the system proceeds to step 208 where it determines whether a configuration file exists for the board. If a configuration file exists, the system displays the configuration information, including jumper and switch locations, in step 210 and returns to step 112. If the configuration file does not exist, the system proceeds to step 212 where it displays a message indicating that a configuration file was not found and then proceeds to step 214 where the system provides the user the opportunity of loading in a configuration file or indicating a directory where the configuration file may be found, for example a collection or database of configuration files provided by the system manufacturer.

If the system determines in step 216 that a directory name was provided, the system then determines in step 218 if slot 0 is being reviewed. In the preferred embodiment this is considered the system board slot, with circuit boards being located in non-zero slots. If the zero slot is being viewed, in step 220, the system displays a list of available system board configuration files. The integrator selects the desired file and control proceeds to step 224. If a non-zero slot is being viewed, the system in step 222 displays a list of the non-system board configuration files located in that directory for selection by the integrator. After a selection is made, control proceeds to step 224.

Control proceeds to step 224 after a configuration file is located in steps 214, 220 or 222. In step 224, the system loads the configuration file and displays the information in step 226. Control then returns to step 112.

If the integrator is performing the configuration procedure on the system being configured, either for the first set up, or if the integrator desires to add a board, delete a board or modify user specifications among choices within a board configuration file, the integrator at step 112 selects the modify option so control proceeds to step 300 (FIG. 3A) where the create/modify option commences. The system presents an option menu in step 302 requesting the integrator to modify or delete a board, load a configuration file or create a configuration file. If the integrator is adding a board for which there is a manufacturer supplied configuration file, control proceeds to step 320.

The integrator proceeds to specify the slot into which the board will be loaded in step 322. In steps 324-332 (FIGS. 3A and 3B), the integrator selects a location for obtaining configuration information as in steps 214-222.

In step 336, The integrator now inserts a board configuration file diskette into the system. The board configuration file diskette contains all of the configuration information and files for boards installed or to be installed in the system.

The system commences to copy the loaded configuration file to the board configuration diskette in step 338 by first determining in step 340 if a duplicate file already exists. If not, in step 348 the loaded file is written onto the diskette and control returns to step 112.

If a file by the same name does already exist, the integrator is given the options of changing the loaded file's name in step 346, overwriting the existing file in step 344 or aborting in step 342. If overwriting or a change of name is selected, control proceeds to step 340 where the loaded file is copied to the diskette and then to step 112. If the abort option was selected, control proceeds directly to step 112.

If the integrator wishes to add a board for which there is no manufacturer supplied configuration file and which configuration file is not contained in the system collection, the integrator selects the modify routine to create a new board configuration file, which commences at step 350. The integrator indicates the slot into which the board will be installed in step 352. The integrator makes certain that the board configuration file diskette is inserted in the system in step 354 to receive the new file. The system proceeds to step 356 where the system provides default values for use in a template. The template with the inserted default values is displayed in step 360. Control then proceeds to step 362 where a utility routine described below is used to create the other required elements of a configuration file and to modify the defaults displayed. Upon completion of the creation of a new configuration file in the utility procedure, control returns to step 364 where the new file is stored on the board configuration file diskette.

Had the integrator desired to delete a board from a configured system in step 112, control proceeds to step 310 where the delete option commences and to step 312. In step 312 the integrator indicates the slot of interest. The system then determines if a board exists in that slot in step 314. If no board exists in the desired slot in step 318, an appropriate message is displayed to the integrator and control is returned to step 112. If a board exists in the selected slot, the system confirms in step 315 that the integrator wishes to remove to board. If not, control proceeds to step 112. If so, the system deletes the board in step 316 and control then returns to step 112.

If the integrator wishes to change the user's specifications or choices in the function resource area of a configuration file, control proceeds from step 112 to step 304 where the modify board option commences. The integrator specifies to the system the slot of the board which he wishes to modify in step 306. By recourse to the board configuration file diskette, the system presents in step 308 the configuration file of the board in the slot selected by the integrator. The integrator indicates the choices in this configuration file that the he wishes to change. When all the changes have been made, control returns to step 112.

This series is performed until all the boards have configuration files or information present on the board configuration file diskette.

When the integrator has stored on the board configuration file diskette a configuration file or information for all boards that the integrator wishes to configure in the computer system, the integrator selects the configure option and control proceeds to step 500 (FIG. 4) where the configuration option actually commences. Based on the stored board configuration files, the system configures the options in step 502 by using the configuration method as described in the ALLOCATE, PROCESS and BACKTRACK subroutines 1100, 1200 and 1300. If the program finds a selection of choices for each board, such that the requirement for common computer system resources can be met for all circuit boards designated without conflict, the system proceeds to step 510 where the system requests the integrator to indicate whether he desires to update the CMOS RAM and save the configuration information in a system definition information file of the computer system on which he is operating. If the integrator is performing the configuration operation on the system to be configured, the integrator will ordinarily update the CMOS RAM and save the configuration information in the system definition information file. If the integrator is configuring a set of circuit boards on one computer system for use in another computer system, then the integrator will not update the CMOS RAM on the machine that is doing the configuring but will save the configuration information in a system definition file, which is done as a selection from the options function 400.

If the system determines in step 510 that the CMOS RAM was updated, the system proceeds to step 512 where it updates the CMOS RAM, saves the configuration information and sets a flag to boot the system. After the flag is set or if the CMOS RAM was not updated, control proceeds to step 112. If the configuration was successful, the integrator can proceed to the view option 200 and view the various boards which have switches and jumpers to allow proper setting of the jumpers and switches as determined by the program.

If the system cannot allocate common computer system resources to all circuit boards demanded without conflict, the appropriate error message is displayed to the integrator in step 505 and control proceeds to step 510. This path allows the integrator to save configurations where not all the boards are fully activated. By appropriately changing the configuration file information the integrator can prepare several of these partial configurations to allow various configurations to be used when needed. For example, if three boards desire to use the two serial ports available, a series of configurations can be developed which allow two of the three boards to be operated when desired.

Other options may be selected by the integrator in step 112. The other options include loading or creating a new system definition file, modifying a configuration file, printing a configuration file or printing a system definition information file. The system proceeds to step 400 where the other options option commences.

In step 402 the available tasks are selected. If a system definition information file is to be loaded or created, control proceeds to step 404 where the integrator chooses to save, load or create. If the save option is chosen, control proceeds to step 406, where a routine is called which converts the present configuration information into the proper format and stores the converted information in an SCI file. Control then proceeds to step 112.

If the create option is chosen, control proceeds to step 416 where a new file is created and displayed having all slots empty. Control then returns to step 112.

If a system definition information file was to be loaded, control proceeds to step 412 where a question is asked confirming the request. If the request is not confirmed, control returns to step 112. If the request is confirmed, a path to obtain the new file is received in step 414, the new file is loaded, the CMOS RAM is updated, the boot flag set and control proceeds to step 112. This allows a file created on a different system to be loaded into a computer system so that the system can be assembled only one time, not assembled, the configuration process performed, disassembled, properly configured boards installed and reassembled.

If a configuration file is to be modified, control proceeds to step 440 to commence the procedure. A display indicating that a configuration file is to be loaded is presented in step 442. Step 444 then obtains the file using procedures similar to those of steps 214 to 224 relating to viewing a configuration file. Control then proceeds to step 446, where the retrieved information is displayed, with default values appearing at the remaining locations. In the next step, step 448, the utility previously referenced in step 362 is called to make any necessary changes to the configuration information. In step 450 a message is displayed to remind the integrator that the configuration file has been changed, and then control proceeds to step 452. In step 452 the configuration file is stored onto the configuration diskette. Control proceeds to step 112.

If in step 402, the integrator desires to print a configuration file, control proceeds to step 408 to commence the procedure. In step 424 the proper way to obtain the file is requested and the file is printed in step 426, after which time control returns to step 112.

The integrator may also print information in a system definition information file. Control proceeds to step 410 where the process commences. If the present systems file is to be printed, control proceeds to step 428 where the file is printed and to step 112. If a different system file is to be printed, control proceeds to step 430 where the proper way to obtain the file is obtained and then proceeds to step 428.

At any time the integrator may request help information from the system. When the F1 key, or other designated key, is depressed, control proceeds to step 600 (FIG. 6) where the help message process starts. The system in 602 determines the screen being presented. Then in step 604 the selection or line on which the cursor rests is determined, the help message database is searched in step 606 and the appropriate message displayed in step 608. Control then returns to wherever it was prior to entering the help process.

The integrator may also select to exit a procedure at any time by pressing the F3 key, or other suitable, designated key. Control proceeds to step 700 where the exit process commences. The system then determines in step 702 if the main menu of step 112 was being displayed. If so, control proceeds to step 703 where the system determines if any changes were made. If not, control proceeds to step 710. If so, control proceeds to step 704. In step 704 the system determines if the changes were saved. If so, control proceeds to step 710 where the integrator is given the option of exiting or ignoring the request to exit. If the choice is to ignore, control returns to step 112. If an exit is to be performed, control proceeds to step 724 where a check of the boot flag is made. If set, the system is rebooted or reinitialized in step 726. If the flag was not set, control exits the configuration program and proceeds to the operating system.

If any changes made were not saved, control proceeds from step 704 to step 706, where the integrator is queried as to whether he wishes to save the changes. If not, control proceeds to step 710. If so, control proceeds to step 500 and the configure option commences.

If the exit key was hit and the main menu of step 112 was not present, control proceeds from step 702 to step 716 where the integrator is given the option of ignoring the key stroke, returning to step 112, or returning to the last previously presented menu or option set. If the key stroke is to be ignored, control proceeds to step 722 and to the step operating upon entry to the exit procedure. If the main menu was requested, control proceeds to step 720 and to step 112. If a return to a previous menu is desired, control proceeds to step 71B and then to the appropriate step.

The integrator may also select to attempt to resolve conflicts at any time. This is especially useful if any resolvable conflict was determined and the integrator has modified a board, for example by changing a CHOICE. The integrator can then simply see if the change resolved the conflict. The integrator presses the F8 key and control proceeds to step 950 where the conflict resolution process commences. Control proceeds to step 952 where the routine utilized and previously discussed in step 502 is called to determine if a conflict exists. Control returns from the conflict routine to step 954, where a message is displayed if an unresolvable conflict still exits. Control then proceeds to the previously presented menu or option set.

Reference was made in step 362 to a utility to create a board configuration file by augmenting and modifying a supplied template with parameter default values. This utility is illustrated in FIGS. 5A-5E. The utility commences at step 800 (FIG. 5A) where the system displays a screen which describes the configuration of the board. Control proceeds to step 802 where the board identification portion commences. The system indicates in step 804 that the integrator is to fill in or modify the appropriate selections. The board identification block is displayed in step 806 and the necessary additions or changes are made.

Control then proceeds to step 808 where the system indicates that the integrator will now be able to add or modify a function statement or identification definition. Control proceeds to step 816 where the function or identification choice is requested.

Assuming the integrator chooses to add or modify a function statement block, control proceeds to step 840 (FIG. 5C), where the option commences. The integrator is informed in step 842 to modify or add the appropriate information to the information displayed in step 844, the required and optional statements in the FUNCTION statement other than Resource and INIT statements. After appropriate operations on the FUNCTION, TYPE, COMMENTS and HELP statements in step 844, control proceeds to step 850.

In step 850 the integrator is informed that he will next be modifying or creating a new choice. Then in step 852, the system requests the integrator to modify or create the choice name, as appropriate. In step 853 the integrator is informed to modify or add the appropriate information to the information relating to the CHOICE statement displayed in step 854. The integrator is next informed in step 855 that he will next be modifying or creating a grouping of the Resource and INIT statements. The various groupings are displayed in step 856 (FIG. 5D) and the integrator chooses one. Control then proceeds to step 857 where the system requests the resources to be used in that CHOICE.

Figure 5A:
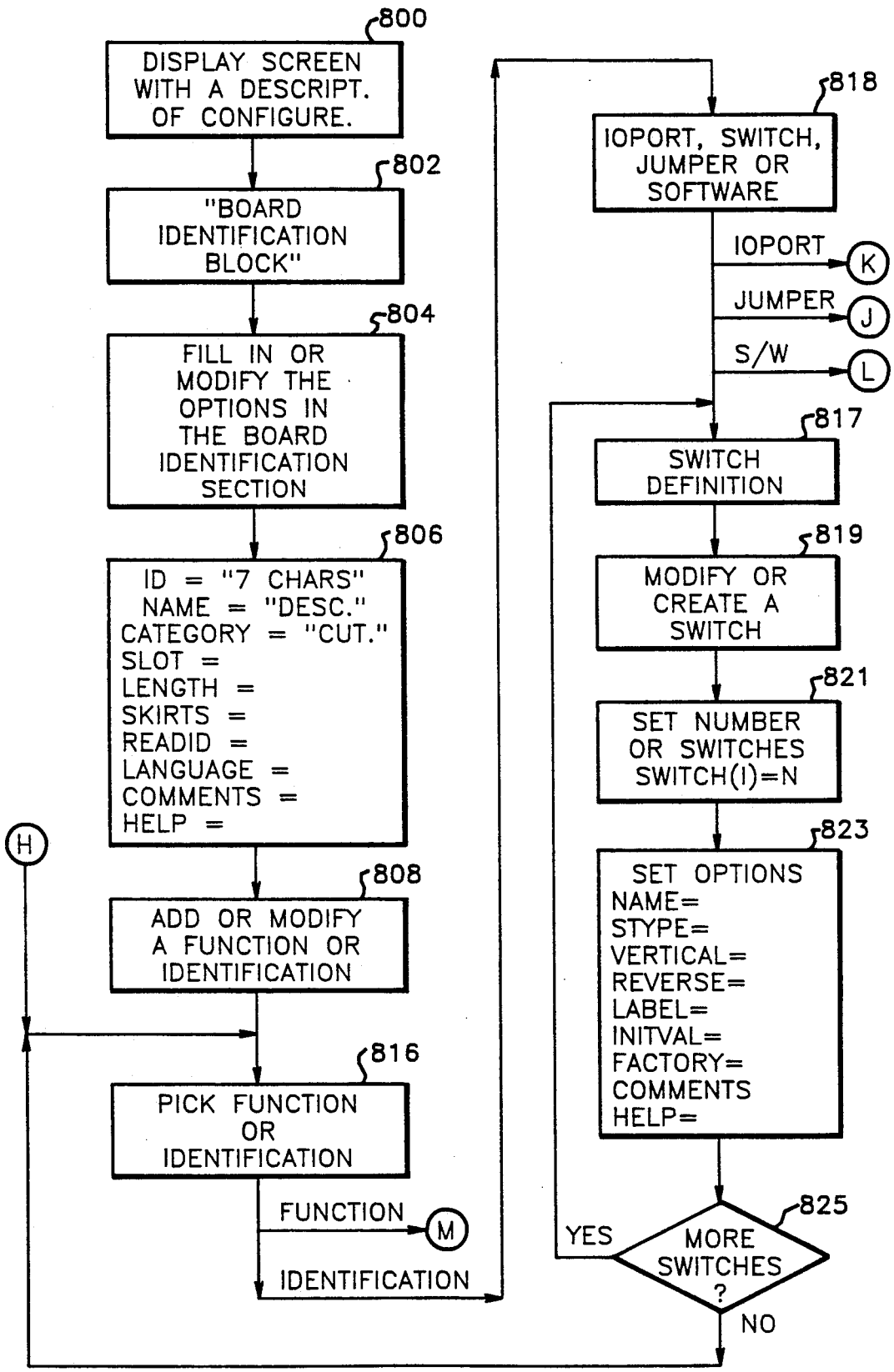
FIGS. 5A, 5B, 5C, 5D and 5E are flowchart illustrations of portions of the operating sequences and menus of a utility that permits the user to create a configuration file according to the present invention.
Figure 5B:
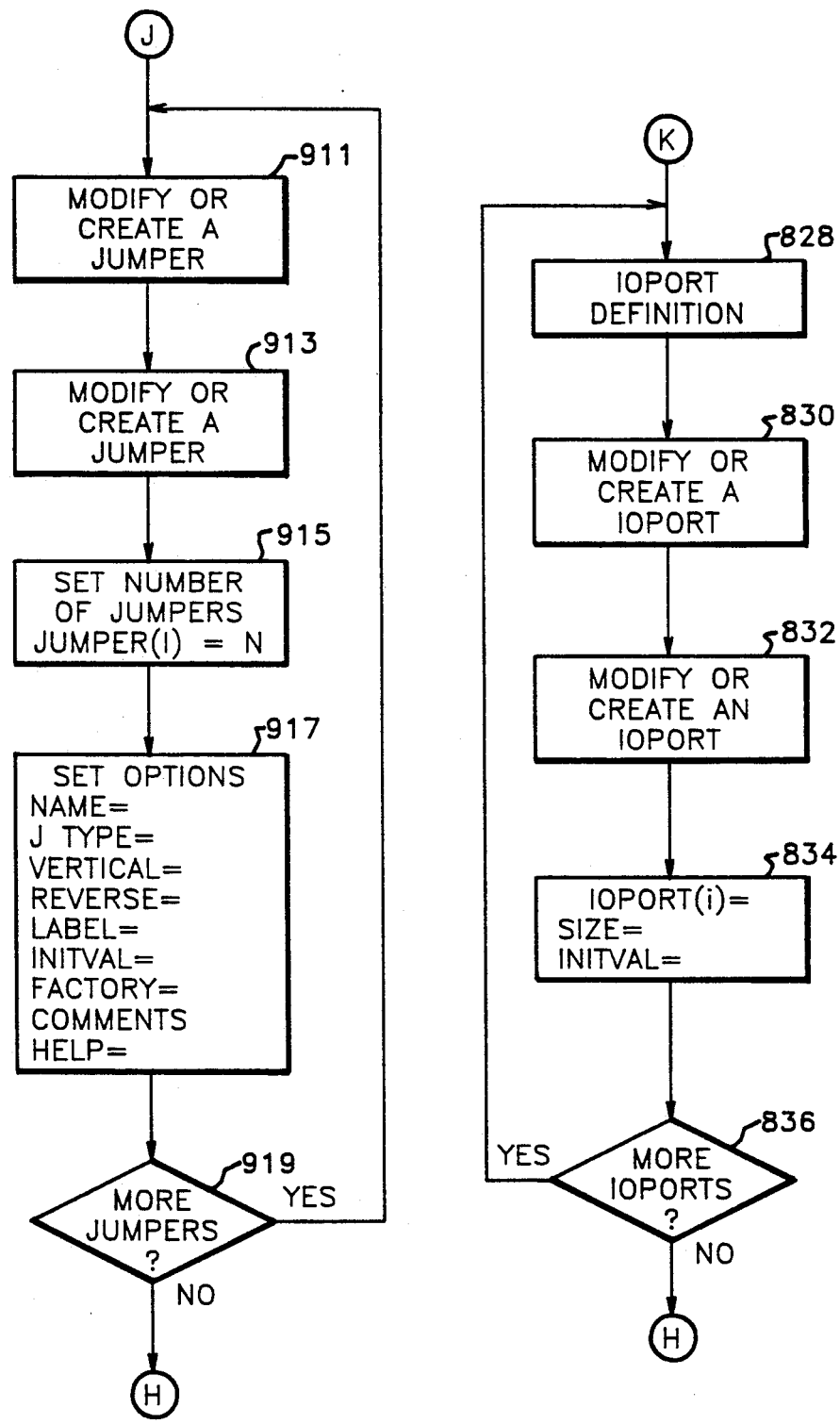
Figure 5C:
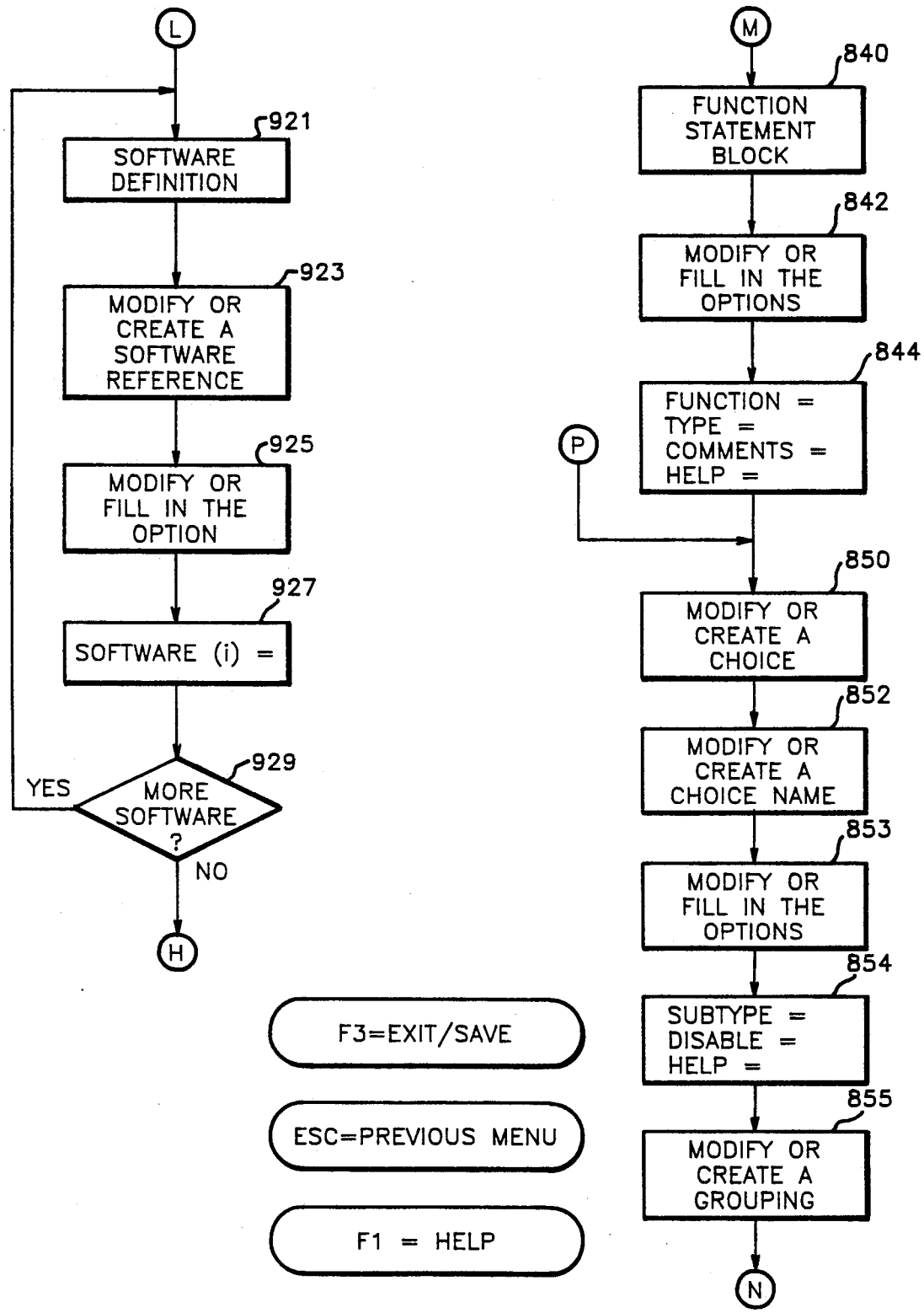
Figure 5D:
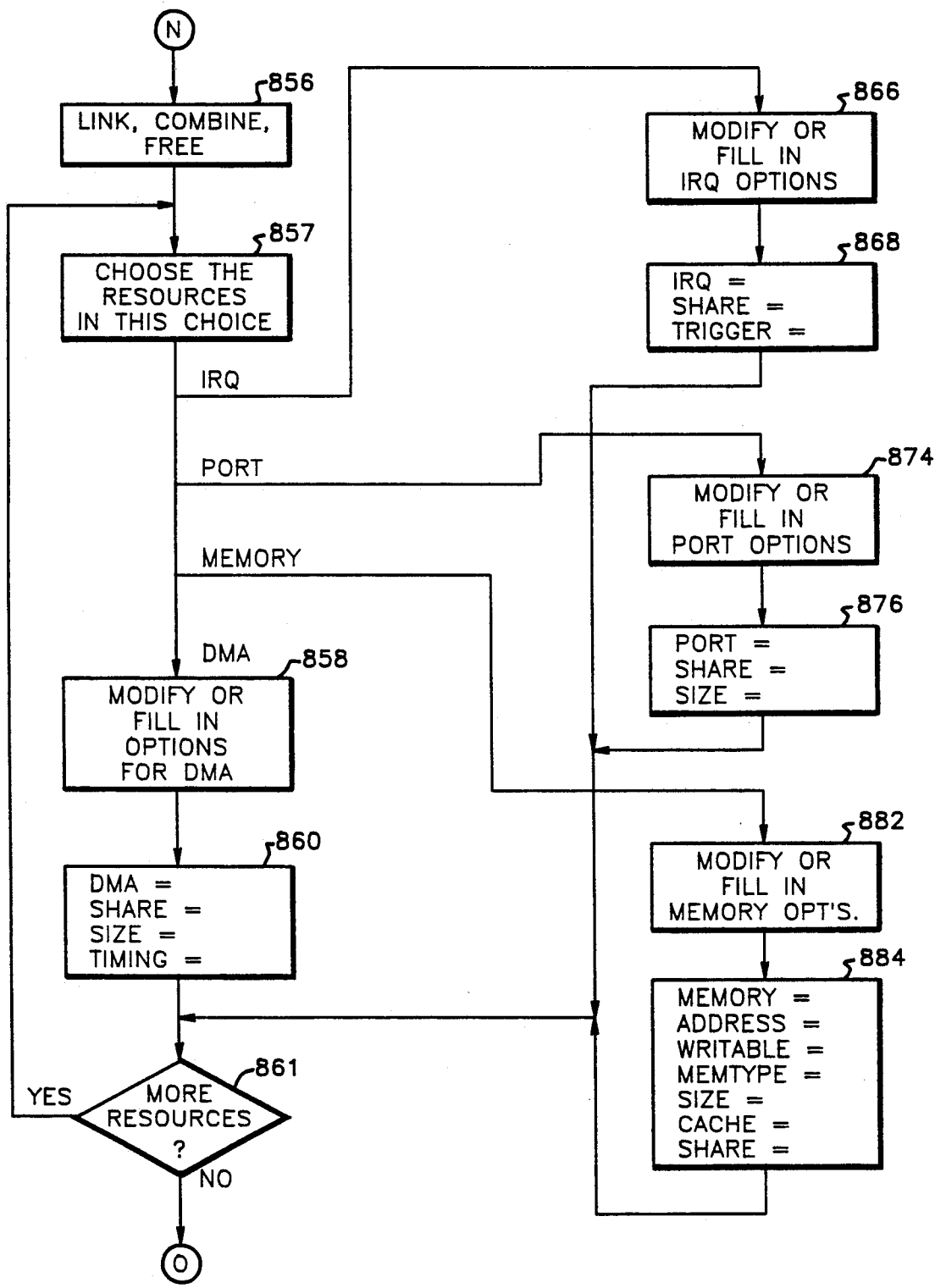
Figure 5E:
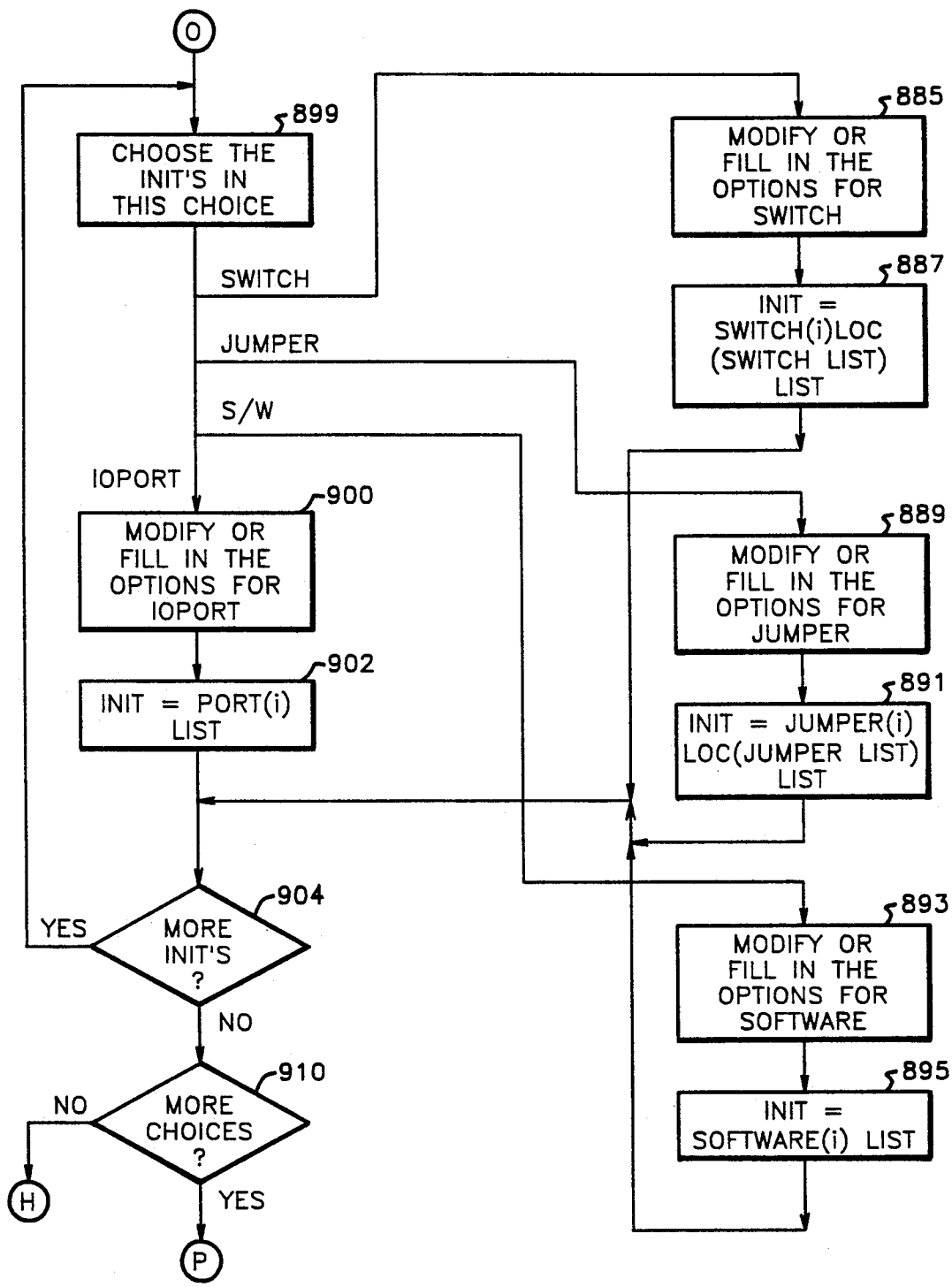
Figure 6:
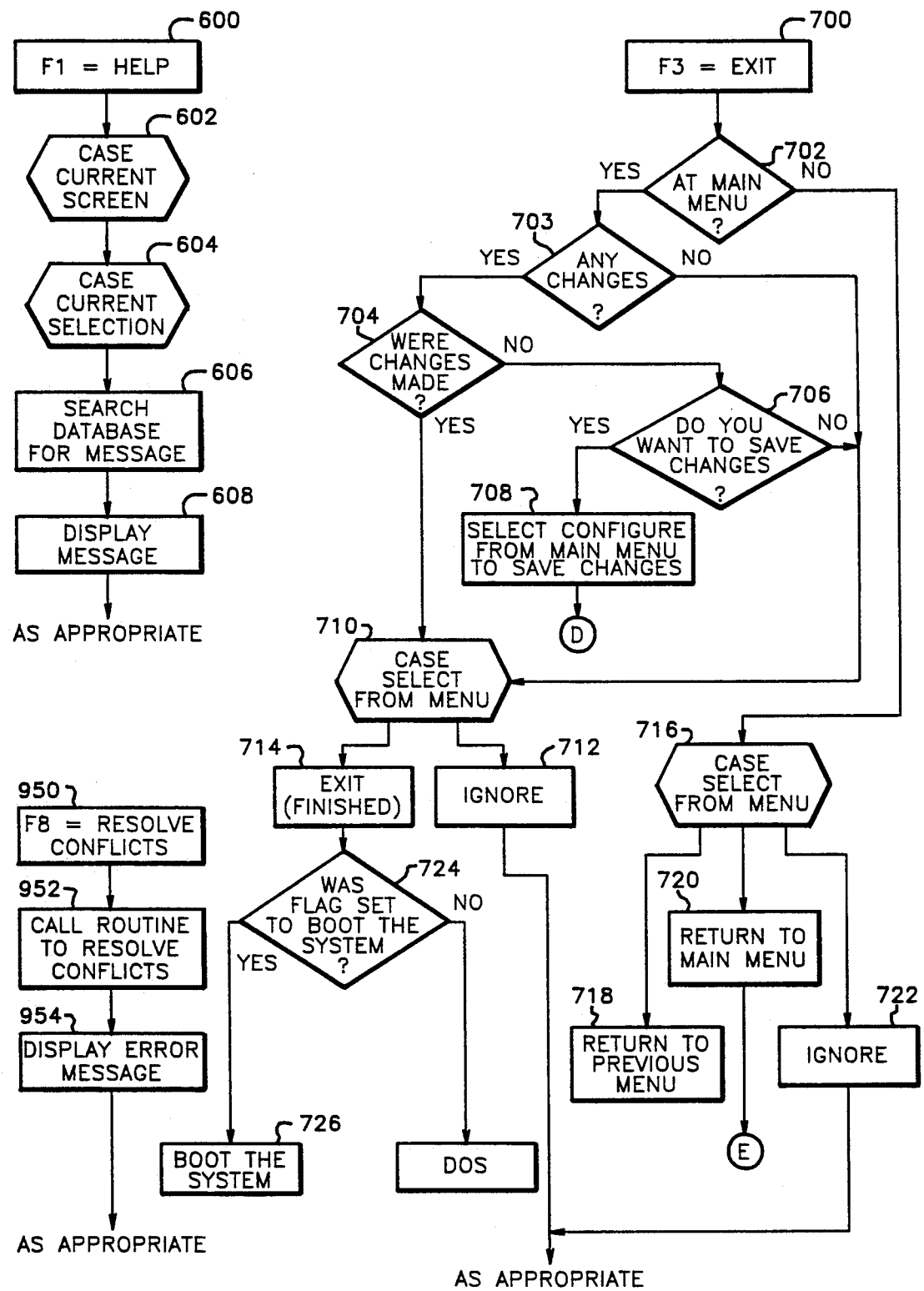

If a DMA channel was to be added, control proceeds to step 858 where the integrator is prompted to modify or add the information needed for the DMA statement. In step 860 the various options are displayed and the integrator adds or modifies as necessary. Control then proceeds to step 861 to see if any more Resource statements are needed. If so, control proceeds to step 857. Otherwise control proceeds to step 899 (FIG. 5E).

If the integrator selected an IRQ statement in step 857, control proceeds to step 866 where the integrator is prompted to modify or add the appropriate information to the items displayed in step 868. After the addition or modification is complete control proceeds to step 861.

If the integrator selected a PORT statement in step 857 control proceeds to step 874 where the integrator is prompted to modify or add the appropriate information to the items relating to the PORT statement displayed in step 876. After completion control proceeds to step 861.

If the integrator selected a MEMORY statement in step 857, control proceeds to step 882. In step 882 the integrator is requested to add or modify, as appropriate, the items displayed in step 884 relating to the MEMORY statement. Control proceeds to step 861.

After completion of all resource statements, step 899 prompts the integrator to request the desired INIT statement. If an I/O port is to be initialized, control proceeds to step 900 where the system prompts the integrator to modify or add information to the IOPORT INIT statement displayed in step 902. Control then proceeds to step 904 where a determination is made if any more INIT statements are necessary. If so, control returns to step 99. If not, control proceeds to step 910, where a determination of whether any more choices are desired is made. If more choices are to be made, control proceeds to step 850. Otherwise control returns to step 816.

If at step 899 the integrator choose to develop a switch initialization, control proceeds to step 885. In step 885 the integrator is requested to modify or add information to the items displayed in step 887 to complete the switch initialization. Control proceeds when completed to step 904.

If the integrator choose to initialize a jumper in step 899, control proceeds to step 889. In step 889 a prompt is displayed so that the integrator will add to or modify the items displayed in step 891. When the jumper initialization is completed, control proceeds to step 904.

If the integrator choose the remaining initialization choice, software, control proceeds to step 893 where a display is presented which requests the integrator for the information to be added or modified in the items displayed by step 895. Control proceeds upon completion to step 904.

If at step 816 identification was requested, control proceeds to step 818 where the integrator chooses whether an I/O port, a switch, a jumper or software is being identified. If a switch is being identified, control proceeds to step 817 where the switch identification procedure commences. In step 819 the integrator is requested to add or modify information in the items displayed in steps 821 and 823 to complete the SWITCH statement. Control proceeds to step 825 to determine if more switches are to be identified. If so, control returns to step 817. If not, controls returns to step 816.

If a jumper is being identified, control proceeds to step 911 (FIG. 5B) where the procedure commences. In step 913 the system requests the integrator to complete the items displayed in steps 915 and 917, thus forming a JUMPER statement. After the JUMPER statement is completed control proceeds to step 919 to determine if more jumpers are to be identified. If not, control proceeds to step 816 while if more jumpers are to be defined, control returns to step 911.

The third available option at step 818 is to define identification values of a port or I/O address location. The procedure starts at step 828. In step 830 the integrator is informed that an I/O port is being identified, with the appropriate information being modified or added in steps 832 and 834. For the following step 836, the integrator indicates if another I/O port identification is to be performed. If so, control returns to step 828; if not, control returns to step 816.

If the fourth option, identifying a software reference was desired, control proceeds from step 818 to step 921, where the procedure commences. In steps 923 and 925 the integrator is prompted that a software reference is being defined and the integrator is to add to or modify the information displayed in step 927 to complete the SOFTWARE statement. After completion control proceeds to step 929 to determine if another software reference is needed. If so, control returns to step 921, otherwise control returns to step 816.

The utility procedure can be exited at any time by hitting the F3 key as indicated by balloon 810. A procedure similar to that of the exit procedure commencing at step 700 is performed. Similarly, the help function 814 is also available.

The conflict resolution routine of the present invention is designed to configure circuit boards without considering all possible permutations of resource allocation and takes into account user set priorities. Its automatic mode is designed to require a minimum amount of user intervention in configuring the system. At the same time, it may be used as part of the fully function utility.

The above utilities have been shown utilizing only the basic features of the configuration information file, not all the advanced features discussed. The advanced features could be included but the preferred embodiment is as disclosed because this simplifies the utilities and allows them to work better with the majority of integrators that will use the utilities. A configuration file having the advanced features is expected to be developed using a standard text editor, a not undue burden for advanced integrators.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

We claim:

1. For use with a computer system that provides for circuit boards to be interchangeably inserted in a plurality of system slot locations, with the circuit boards having the capability to be configured to utilize one or more common computer resources, the common computer resources comprising slot locations, interrupt request lines, direct memory access channels, input/output port addresses and memory address ranges, a method for dynamically and automatically configuring the computer system and the circuit boards without user intervention comprising the computer implemented steps of:

determining based upon a configuration of each of said circuit boards the common computer resources capable of being utilized by the circuit boards to be installed in the computer system;

allocating the common computer resources to be utilized by the circuit boards based on said determination of the common computer resources capable of being utilized by the circuit boards to be installed in the computer system;

detecting conflicts as to the common computer resources allocated to the circuit boards to be installed in the computer system;

resolving conflicts as to the common computer resources to be utilized by the circuit boards to be installed in the computer system and re-allocating the common computer resources based upon said resolution of said common computer resource conflicts; and storing configuration information as part of a system configuration for each of the circuit boards and the computer system based on said allocation of the common computer resources to be utilized by the circuit boards.

2. The method of claim 1, further including the computer implemented step of determining values for initializing selected circuit board operational features and storing the circuit board and the computer system configuration information based on said initialization values.

3. The method of claim 1, further including the computer implemented step of determining the slot location in which a circuit board is inserted and storing said circuit board configuration information based on said slot location.

4. The method of claim 1, wherein the computer implemented step of determining the common computer resources capable of being utilized by the circuit boards to be installed in the computer system includes the computer implemented steps of:

identifying the circuit boards to be installed in the computer system; and obtaining information on the common computer resources capable of being utilized by said identified circuit boards from a source of configuration information.

5. The method of claim 1, wherein the computer implemented step of determining the common computer resources includes utilizing a circuit board configuration file format for indicating the common computer resources capable of being utilized by the circuit board and for indicating the identification of the circuit board.

6. The method of claims 1, 4, or 5, wherein the computer implemented step of determining the common computer resources capable of being utilized by the circuit boards to be installed in the computer system includes utilizing a circuit board configuration file having various statements which follow a defined configuration file format for indicating the common computer resources capable of being utilized by the circuit boards.

7. The method of claim 4, wherein the computer implemented step of determining the common computer resources capable of being utilized by the circuit boards to be installed in the computer system includes the computer reading said circuit board configuration information from a mass storage device.

8. The method of claim 4, wherein the computer implemented step of determining the common computer resources capable of being utilized by the circuit boards to be installed in the computer system includes the computer reading said circuit board configuration information from a battery-powered CMOS random access memory.

9. The method of claim 4, wherein the computer implemented step of determining the common computer resources capable of being utilized by the circuit boards to be installed in the computer system includes the computer reading a circuit board configuration file, said configuration file having various statements which follow a defined file format and creating a sorted array of said statements from all of said circuit board configuration files for all of the circuit boards to be installed in the computer system in a statement hierarchical order.

10. The method of claim 9, wherein the computer implemented step of detecting conflicts as to the common computer resources allocated to the circuit boards to be installed in the computer system further includes the computer implemented steps of:

determining whether a requested common computer resource has been previously allocated to another circuit board, thereby creating a conflict resource request;

identifying said circuit board configuration film statement containing said conflicting resource request, known as a conflicting allocation; and identifying said circuit board configuration file statement to which the requested common computer resource was previously allocated, known as a prior allocation.

11. The method of claim 10, wherein the computer implemented step of identifying said circuit board configuration files containing said conflicting and prior allocations further includes the computer implemented steps of:

identifying said circuit board configuration file statement which references said conflicting allocation, known as a conflicting allocation parent;

identifying said circuit board configuration file statement which references said conflicting allocation parent, known as a conflicting allocation grandparent;

identifying said circuit board configuration file statement which references said prior allocation, know as a prior allocation parent; and identifying said circuit board configuration file statement which references said prior allocation parent, known as a prior allocation grandparent.

12. The method of claim 11, wherein the computer implemented step of resolving said conflicts includes the computer implemented steps of:

determining if an alternate common computer resource is specified for said conflicting allocation; and allocating said alternate common computer resource to said conflicting allocation when an alternate common computer resource is specified.

13. The method of claim 12, wherein the computer implemented step of resolving said conflicts includes the computer implemented steps of:

determining if an alternate common computer resource is specified for said conflicting allocation parent; and allocating said alternate common computer resource to said conflicting allocation parent when an alternate common computer resource is specified.

14. The method of claim 13, wherein the computer implemented step of the computer resolving said conflicts includes the computer implemented steps of:

determining if an alternate common computer resource is specified for said conflicting allocation grandparent; and allocating said alternate common computer resource to said conflicting allocation grandparent when an alternate common computer resource is specified.

15. The method of claim 11, wherein the computer implemented step of resolving said conflicts further includes the computer implemented steps of:

determining if an alternate common computer resource is specified for said prior allocation; and allocating said alternate common computer resource to said prior allocation when an alternate common computer resource is specified.

16. The method of claim 15, wherein the computer implemented step of resolving said conflicts includes the computer implemented steps of:

determining if an alternate common computer resource is specified for said prior allocation parent; and allocating said alternate common computer resource to said prior allocation parent when an alternate common computer resource is specified.

17. The method of claim 16, wherein the computer implemented step of resolving said conflicts includes the computer implemented steps of:

determining if an alternate common computer resource is specified for said prior allocation grandparent; and allocating said alternate common computer resource to said prior allocation grandparent when an alternate common computer resource is specified.

18. The method of claim 11, wherein the computer implemented step of resolving said conflicts includes the computer implemented steps of:
- determining if said conflicting allocation and said prior allocation, said prior allocation parent or said prior allocation grandparent are capable of sharing said requested common computer resource; and
- allocating said requested common computer resource to said conflicting allocation when sharing is specified.

19. The method of claim 18, wherein the computer implemented step of resolving said conflicts includes the computer implemented steps of:
- determining if said conflicting allocation parent and said prior allocation, said prior allocation parent or said prior allocation grandparent are capable of sharing said requested common computer resource; and
- allocating said requested common computer resource to said conflicting allocation parent when sharing is specified.

20. The method of claim 19, wherein the computer implemented step of resolving said conflicts includes the computer implemented steps of:
- determining if said conflicting allocation grandparent and said prior allocation, said prior allocation parent or said prior allocation grandparent are capable of sharing said requested common computer resource; and
- allocating said requested common computer resource to said conflicting allocation grandparent when sharing is specified.

21. The method of claims 1 or 4, further including the computer implemented step of displaying the common computer resources capable of being utilized by the circuit boards to be installed in the computer system.

22. The method of claims 1, 2, 3, 4, or 5, wherein the computer implemented step of storing said configuration information includes storing said configuration information as a file on a mass storage device.

23. The method of claims 1, 2, 3, 4, or 5, wherein the computer implemented step of storing said configuration information includes storing said configuration information in battery-powered CMOS random access memory in the computer system and in a mass storage device file.

24. The method of claim 11, wherein the computer implemented step of resolving said conflicts includes the computer implemented steps of:
- determining if said circuit board configuration file containing said conflicting allocation specifies said conflicting allocation is capable of being disabled; and
- disabling said conflicting allocation when disabling is specified.

25. The method of claim 24, wherein the computer implemented step of resolving said conflicts includes the computer implemented steps of:
- determining if said circuit board configuration file containing said conflicting allocation parent specifies said conflicting allocation parent is capable of being disabled; and
- disabling said conflicting allocation parent when disabling is specified.

26. The method of claim 25, wherein the computer implemented step of resolving said conflicts includes the computer implemented steps of:
- determining if said circuit board configuration file containing said conflicting allocation grandparent specifies said conflicting allocation grandparent is capable of being disabled; and
- disabling said conflicting allocation grandparent when disabling is specified.

27. The method of claim 11, wherein the computer implemented step of resolving said conflicts includes the computer implemented steps of:
- determining if said circuit board configuration file containing said prior allocation specifies said prior allocation is capable of being disabled; and
- disabling said prior allocation when disabling is specified.

28. The method of claim 27, wherein the computer implemented step of resolving said conflicts includes the computer implemented steps of:
- determining if said circuit board configuration file containing said prior allocation parent specifies said prior allocation parent is capable of being disabled; and
- disabling said prior allocation parent when disabling is specified.

29. The method of claim 28, wherein the computer implemented step of resolving said conflicts includes the computer implemented steps of:
- determining if said circuit board configuration file containing said prior allocation grandparent specifies said prior allocation grandparent is capable of being disabled; and
- disabling said conflicting allocation grandparent when disabling is specified.

30. The method of claim 11, wherein the computer implemented step of resolving said conflicts further includes not allocating the common computer resources to be utilized by said conflicting allocation, thereby deactivating the circuit board corresponding to said circuit board configuration file which includes said conflicting allocation.

31. The method of claim 30, further including the computer implemented step of displaying the deactivation of circuit boards installed in the computer system.

32. The method of claim 1, further including the computer implemented step of system displaying the common computer resources allocated to the circuit boards to be installed in the computer system.

33. An apparatus for dynamically and automatically configuring a computer system without user intervention that provides for circuit boards to be interchangeably inserted in a plurality of computer system slot locations, with the circuit boards having the capability to be configured to utilize one or more common computer resources, the common computer resources comprising slot locations, interrupt request lines, direct memory access channels, input/output port addresses and memory address ranges, comprising:
- means for determining based upon a configuration of each of said circuit boards the common computer resources capable of being utilized by the circuit boards to be installed in the computer system;
- means for allocating the common computer resources capable of being utilized by the circuit boards to be installed in the computer system based on said determination of the common computer resources capable of being utilized by the circuit boards;
- means for detecting conflicts as to the common computer resources allocated to the circuit boards to be installed in the computer system;

means for resolving said conflicts as to the common computer resources allocated to the circuit boards to be installed in the computer system and reallocating the common computer resources to the circuit boards based upon said resolution of said common computer resource conflicts; and means for storing configuration information as part of a system configuration for each of the circuit boards to be installed in the computer system based on said allocation of the common computer resources.

34. The apparatus of claim 33, further including means for displaying the common computer resources allocated to the circuit boards installed in the computer system.

35. The apparatus of claim 33, including means for determining values for initializing selected circuit board operational features and storing said configuration information based on said initialization values.

36. The apparatus of claim 33, including means for determining the computer system slot location in which a circuit board is inserted and storing said configuration information based on said slot location.

37. The apparatus of claim 33, wherein said means for determining the common computer resources capable of being utilized by the circuit boards to be installed in the computer system includes:
   means for identifying the circuit boards to be installed in the computer system; and
   means for obtaining information on the common computer resources capable of being utilized by the identified circuit boards from a source of configuration information.

38. The apparatus of claim 33, wherein said means for determining the common computer resources capable of being utilized by the circuit boards to be installed in the computer system includes means for utilizing a circuit board configuration file format for indicating the common computer resources capable of being utilized by the circuit board and means for indicating the identification of the circuit board.

39. The apparatus of claim 37, wherein said means for determining the common computer resources capable of being utilized by the circuit boards to be installed in the computer system includes the computer reading said circuit board configuration information from a mass storage device.

40. The apparatus of claim 37, wherein said means for determining the common computer resources capable of being utilized by the circuit boards to be installed in the computer system includes the computer reading said circuit board configuration information from a battery-powered CMOS random access memory.

41. The apparatus of claims 33, 37, or 38, wherein said means for determining the common computer resources capable of being utilized by the circuit boards to be installed in the computer system includes the computer reading said circuit board configuration file, said configuration file having various statements which follow a defined configuration file format for indicating the common computer resources capable of being utilized by the circuit boards.

42. The apparatus of claims 33, 35, 36, 37 or 38, wherein said means for storing said configuration information includes storing said configuration information as a file on a mass storage device.

43. The apparatus of claims 33, 35, 36, 37 or 38, wherein said means for storing said configuration information in battery-powered CMOS random access memory in the computer system and in a mass storage device file.

44. The apparatus of claim 37, wherein said means for determining the common computer resources capable of being utilized by the circuit boards to be installed in the computer system includes the computer reading a circuit board configuration file, said configuration file having various statements which follow a defined file format and the computer system creating a sorted array of said statements from all of said circuit board configuration files for all of the circuit boards to be installed in the computer system in a statement hierarchical order.

45. The apparatus of claim 44, wherein said means for detecting said conflicts as to the common computer resources allocated to the circuit boards to be installed in the computer system further includes:
   means for determining whether the requested common computer resource has been previously allocated to another circuit board, thereby creating a conflicting resource request;
   means for identifying said circuit board configuration file containing said conflicting resource request, known as a conflicting allocation; and
   means for identifying said circuit board configuration file to which the common computer resource to be utilized was previously allocated, known as a prior allocation.

46. The apparatus of claim 45, wherein said means for identifying said circuit board configuration files containing said conflicting and said prior allocations further includes:
   means for identifying said circuit board configuration file statement which references said conflicting allocation, known as a conflicting allocation parent;
   means for identifying said circuit board configuration file statement which references said conflicting allocation parent, known as a conflicting allocation grandparent;
   means for identifying said circuit board configuration file statement which references said prior allocation, known as a prior allocation parent; and
   means for identifying said circuit board configuration file statement which references said prior allocation parent, known as a prior allocation grandparent.

47. The apparatus of claim 46, wherein said means for resolving said conflicts includes:
   means for determining if an alternate common computer resource is specified for said conflicting allocation; and
   means for allocating said alternate common computer resource to said conflicting allocation when an alternate common computer resource is specified.

48. The apparatus of claim 47, wherein said means for resolving said conflicts includes:
   means for determining if an alternate common computer resource is specified for said conflicting allocation parent; and
   means for allocating said alternate common computer resource to said conflicting allocation parent when an alternate common computer resource is specified.

49. The apparatus of claim 48, wherein said means for resolving said conflicts includes:

means for determining if an alternate common computer resource is specified for said conflicting allocation grandparent; and means for allocating said alternate common computer resource to said conflicting allocation grandparent when an alternate common computer resource is specified.

50. The apparatus of claim 46, wherein said means for resolving said conflicts further includes:

means for determining if an alternate common computer resource is specified for said prior allocation; and means for allocating said alternate common computer resource to said prior allocation when an alternate common computer resource is specified.

51. The apparatus of claim 50, wherein said means for resolving said conflicts includes:

means for determining if an alternate common computer resource is specified for said prior allocation parent; and means for allocating said alternate common computer resource to said prior allocation parent when an alternate common computer resource is specified.

52. The apparatus of claim 51, wherein said means for resolving said conflicts includes:

means for determining if an alternate common computer resource is specified for said prior allocation grandparent; and means for allocating said alternate common computer resource to said prior allocation grandparent when an alternate common computer resource is specified.

53. The apparatus of claim 46, wherein said means for resolving said conflicts includes:

means for determining if said conflicting allocation and said prior allocation, said prior allocation parent or said prior allocation grandparent are capable of sharing said requested common computer resource; and means for allocating said requested common computer resource to said conflicting allocation when sharing is specified.

54. The apparatus of claim 53, wherein said means for resolving said conflicts includes:

means for determining if said conflicting allocation parent and said prior allocation, said prior allocation parent or said prior allocation grandparent are capable of sharing said requested common computer resource; and means for allocating said requested common computer resource to said conflicting allocation parent when sharing is specified.

55. The apparatus of claim 54, wherein said means for resolving said conflicts includes:

means for determining if said conflicting allocation grandparent and said prior allocation, said prior allocation parent or said prior allocation grandparent are capable of sharing said requested common computer resource; and means for allocating said requested common computer resource to said conflicting allocation grandparent when sharing is specified.

56. The apparatus of claim 46, wherein said means for resolving said conflicts includes:

means for determining if said circuit board configuration file containing said prior allocation specifies said prior allocation is capable of being disabled; and means for disabling said prior allocation when disabling is specified.

57. The apparatus of claim 56, wherein said means for resolving said conflicts includes:

means for determining if said circuit board configuration file containing said prior allocation parent specifies said prior allocation parent is capable of being disabled; and means for disabling said prior allocation parent when disabling is specified.

58. The apparatus of claim 57, wherein said means for resolving said conflicts includes:

means for determining if said circuit board configuration file containing said prior allocation grandparent specifies said prior allocation grandparent is capable of being disabled; and means for disabling said conflicting allocation grandparent when disabling is specified.

59. The apparatus of claim 56, wherein said means for resolving said conflicts includes:

means for determining if said circuit board configuration file containing said conflicting allocation specifies said conflicting allocation is capable of being disabled; and means for disabling said conflicting allocation when disabling is specified.

60. The apparatus of claim 59, wherein said means for resolving said conflicts includes:

means for determining if said circuit board configuration file containing said conflicting allocation parent specifies said conflicting allocation parent is capable of being disabled; and means for disabling said conflicting allocation apparent when disabling is specified.

61. The apparatus of claim 60, wherein said means for resolving said conflicts includes:

means for determining if said circuit board configuration file containing said conflicting allocation grandparent specifies said conflicting allocation grandparent is capable of being disabled; and means for disabling said conflicting allocation grandparent when disabling is specified.

62. The apparatus of claim 46, wherein said means for resolving said conflicts further includes not allocating the common computer resource to be utilized by said conflicting allocation, thereby deactivating the circuit board.

63. The apparatus of claim 62, further including means for displaying said deactivation of the circuit board installed in the computer system.

64. The apparatus of claim 33 or 40, further including means for displaying the common computer resources capable of being utilized by the circuit boards to be installed in the computer system.

* * * * *

UNITED STATES PATENT AND TRADEMARK OFFICE
CERTIFICATE OF CORRECTION

PATENT NO. :       5,257,387
DATED       :       October 26, 1993
INVENTOR(S) :      Martin D. Richek, et al.

It is certified that error appears in the above-identified patent and that said Letters Patent is hereby corrected as shown below:

In col. 43, line 55, please replace "conflict" with --conflicting--.

In col. 43, line 57, please replace "film" with --file--.

In col. 50, lines 42-43, "apparent" should read--parent--. parent--.

In col. 50, line 28, please replace "claim 56" with --claim 46--.

In col. 50, line 60, please replace "40" with --38--.

Signed and Sealed this

Eleventh Day of July, 1995

Attest:

BRUCE LEHMAN

Attesting Officer    Commissioner of Patents and Trademarks